(12) United States Patent
Ghosh et al.

(10) Patent No.: US 11,609,906 B1
(45) Date of Patent: Mar. 21, 2023

(54) APPARATUSES, COMPUTER-IMPLEMENTED METHODS, AND COMPUTER PROGRAM PRODUCTS FOR IMPROVED FILE SCANNING AND REMEDIATION IN DATA SYSTEMS

(71) Applicant: Wells Fargo Bank, N.A., San Francisco, CA (US)

(72) Inventors: Deepa Ghosh, Charlotte, NC (US); Lisa M. Lee, Salt Lake, UT (US); Jamie Kennedy, Charlotte, NC (US); Donna Johnson, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/224,355

(22) Filed: Apr. 7, 2021

(51) Int. Cl.
*G06F 16/2452* (2019.01)
*G06F 16/25* (2019.01)

(52) U.S. Cl.
CPC ........ *G06F 16/2452* (2019.01); *G06F 16/252* (2019.01)

(58) Field of Classification Search
CPC ........................ G06F 16/2452; G06F 16/252
See application file for complete search history.

(56) References Cited

U.S. PATENT DOCUMENTS

2021/0026982 A1* 1/2021 Amarendran ....... G06F 21/6218

FOREIGN PATENT DOCUMENTS

WO     WO-0133433 A1 *  5/2001  ........... G06F 16/252

OTHER PUBLICATIONS

Netwrix Auditor Administrators Guide, Version 6.5, pp. 1-232. (Year: 2014).*
Solow, Announcing Content Scanning: File Security Your Users Will Love, pp. 1-8 (Year: 2020).*
File Security & Integrity Monitoring, pp. 1-7 (Year: 2020).*
How to Keep Track of Changes Made to Your Files and Folders, pp. 1-10 (Year: 2019).*

* cited by examiner

*Primary Examiner* — Albert M Phillips, III
(74) *Attorney, Agent, or Firm* — Womble Bond Dickinson (US) LLP

(57) ABSTRACT

Embodiments of the present disclosure enable improved methodologies of scanning large file repositories and managing target files identified from such scanning efficiently and effectively. Embodiments of the present disclosure scan any number of file repositories of a data system to identify particular target files that satisfy scan criteria, and process the target files identified therefrom. The target files may be processed to identify file owner data and utilize the file owner data for any of a myriad of purposes, for example to provide scan alert(s) corresponding to the target files to such users. Any of a number of file remediation actions may be performed based on the scan results, for example by the users receiving scan alert(s) and/or automatically in the embodiments described.

20 Claims, 10 Drawing Sheets

APPARATUSES, COMPUTER-IMPLEMENTED METHODS, AND COMPUTER PROGRAM PRODUCTS FOR IMPROVED FILE SCANNING AND REMEDIATION IN DATA SYSTEMS

TECHNOLOGICAL FIELD

Embodiments of the present disclosure generally relate to improved file scanning and remediation, and specifically to methodologies for scanning one or more file repositories of a data system of any size for target files meeting particular scan criteria and processing such target files to enable initiation of remedial actions associated with storage of the target files.

BACKGROUND

Scanning for a particular target files meeting a particular classification in a data system is often cumbersome and/or prohibitively time consuming. Additionally, conventional implementations perform such scans over long periods of time often and merely provide the results of the scan to the user that initiated the scan on the device the user utilized to initiate the scan. Applicant has discovered problems with current implementations of file scanning in data systems, and particularly in large data system comprising a significant number of files. Through applied effort, ingenuity, and innovation, Applicant has solved many of these identified problems by developing embodied in the present disclosure, which are described in detail below.

BRIEF SUMMARY

In general, embodiments of the present disclosure provided herein enable efficient, yet still sufficiently accurate scanning to identify target files, for example an End-User Computing Tool (EUCT), in large data system (e.g., systems having one or more repositories hosting a number of files that would be computationally impossible to process efficiently and accurately utilizing conventional methodologies, such as hundreds of millions, billions, or more of such files). Other implementations for improved scanning for target files in a large data system will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for improved target file scanning and processing is provided. The example computer-implemented method is performed by any of a myriad of computing devices embodied in hardware, software, firmware, and/or a combination thereof. One example embodiment computer-implemented method includes scanning a file repository, based on scan criteria, to identify a target file satisfying the scan criteria, the target file associated with file detail data comprising at least a file owner identifier corresponding to a user. The example computer-implemented method further includes retrieving, from a personnel database, file owner data associated with the target file based on the file owner identifier. The example computer-implemented method further includes providing a scan alert associated with at least the target file to the user.

Additionally or alternatively, in some embodiments of the example computer-implemented method, providing the scan alert associated with at least the target file to the user includes causing rendering of a scan results dashboard interface comprising the scan alert.

Additionally or alternatively, in some embodiments of the example computer-implemented method, the example computer-implemented method further includes initiating a file remediation action associated with at least the target file identified via the scan in response to user interaction with the scan alert.

Additionally or alternatively, in some embodiments of the example computer-implemented method, the example computer-implemented method further includes automatically initiating a file remediation action in response to identification of the target file satisfying the scan criteria.

Additionally or alternatively, in some embodiments of the example computer-implemented method, providing the scan alert associated with at least the target file to the user comprises causing transmitting of a third-party data transmission comprising the scan alert to a third-party user communication profile associated with the user, the third-party user communication profile identified from the file owner data associated with the target file.

Additionally or alternatively, in some embodiments of the example computer-implemented method, the scan further identifies a second target file satisfying the scan criteria, the second target file associated with second file detail data comprising at least a second file owner identifier corresponding to a second user, and the example computer-implemented method further includes retrieving, from the personnel database, second file owner data associated with the second target file based on the second file owner identifier; and providing a second scan alert associated with at least the second target file to the second user.

Additionally or alternatively, in some embodiments of the example computer-implemented method, the file owner identifier comprises file permissions data associated with the target file.

Additionally or alternatively, in some embodiments of the example computer-implemented method, the file owner identifier comprises file authorship data associated with the target file.

Additionally or alternatively, in some embodiments of the example computer-implemented method, the scan further identifies a second target file satisfying the scan criteria, the second target file associated with second file detail data comprising at least the file owner identifier corresponding to the user, where the scan alert is further associated with the target file.

In accordance with another aspect of the present disclosure, an apparatus for improved target file scanning and processing is provided. In one example embodiment apparatus, the apparatus includes at least one processor and at least one memory, the at least one memory having computer-coded instructions stored thereon that, in execution with the at least one processor, configure the apparatus to perform any one of the example computer-implemented methods described herein. In another example embodiment apparatus, the apparatus includes means for performing each step of any one of the example computer-implemented methods described herein.

In accordance with yet another aspect of the present disclosure, a computer program product for improved target file scanning and processing is provided. In one example embodiment computer program product, the computer program product includes at least one non-transitory computer-readable storage medium having computer code stored thereon that, in execution with at least one processor, is configured for performing any one of the example computer-implemented methods described herein.

BRIEF DESCRIPTION OF THE DRAWINGS

Figure 1:
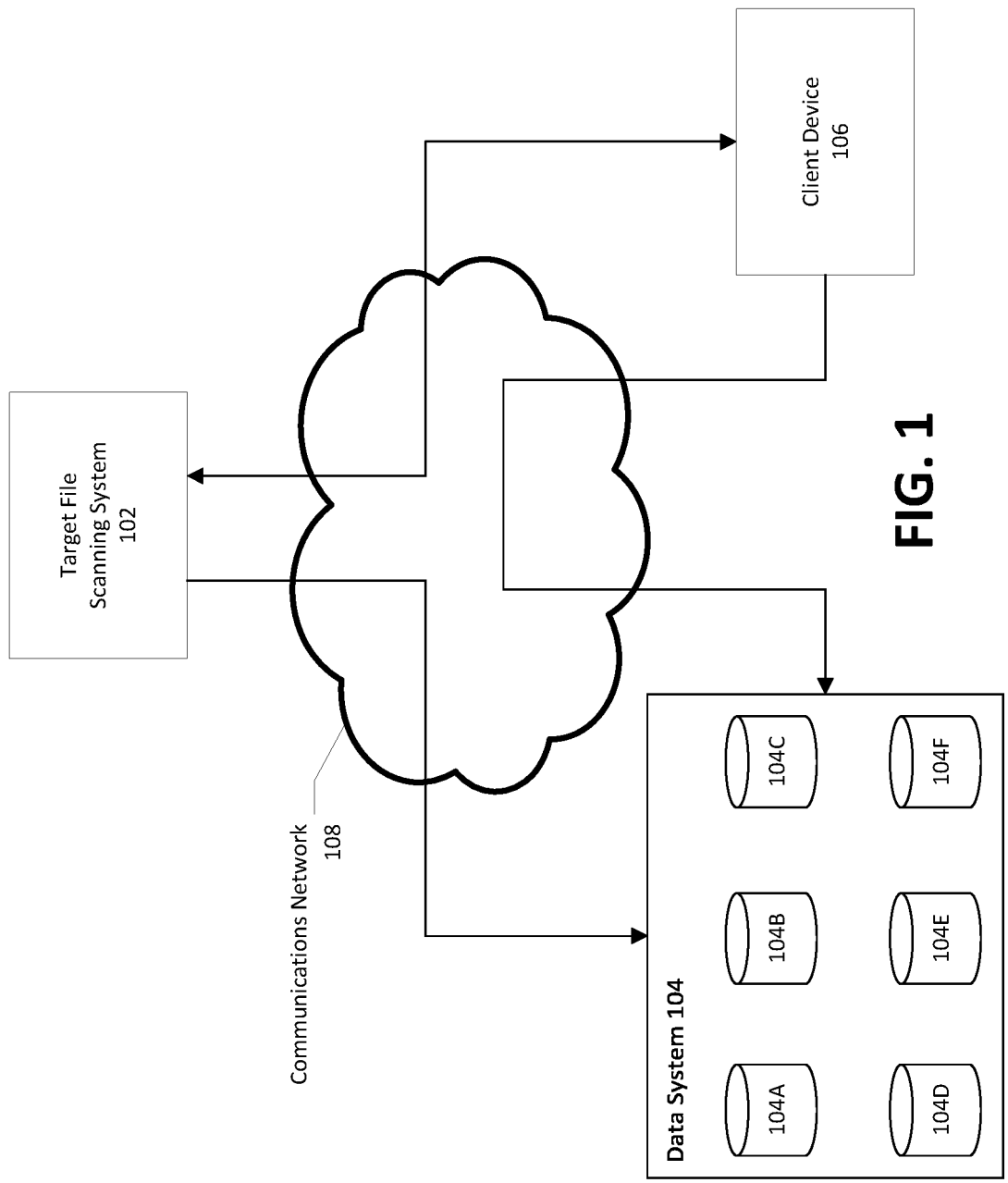
Figure 2:
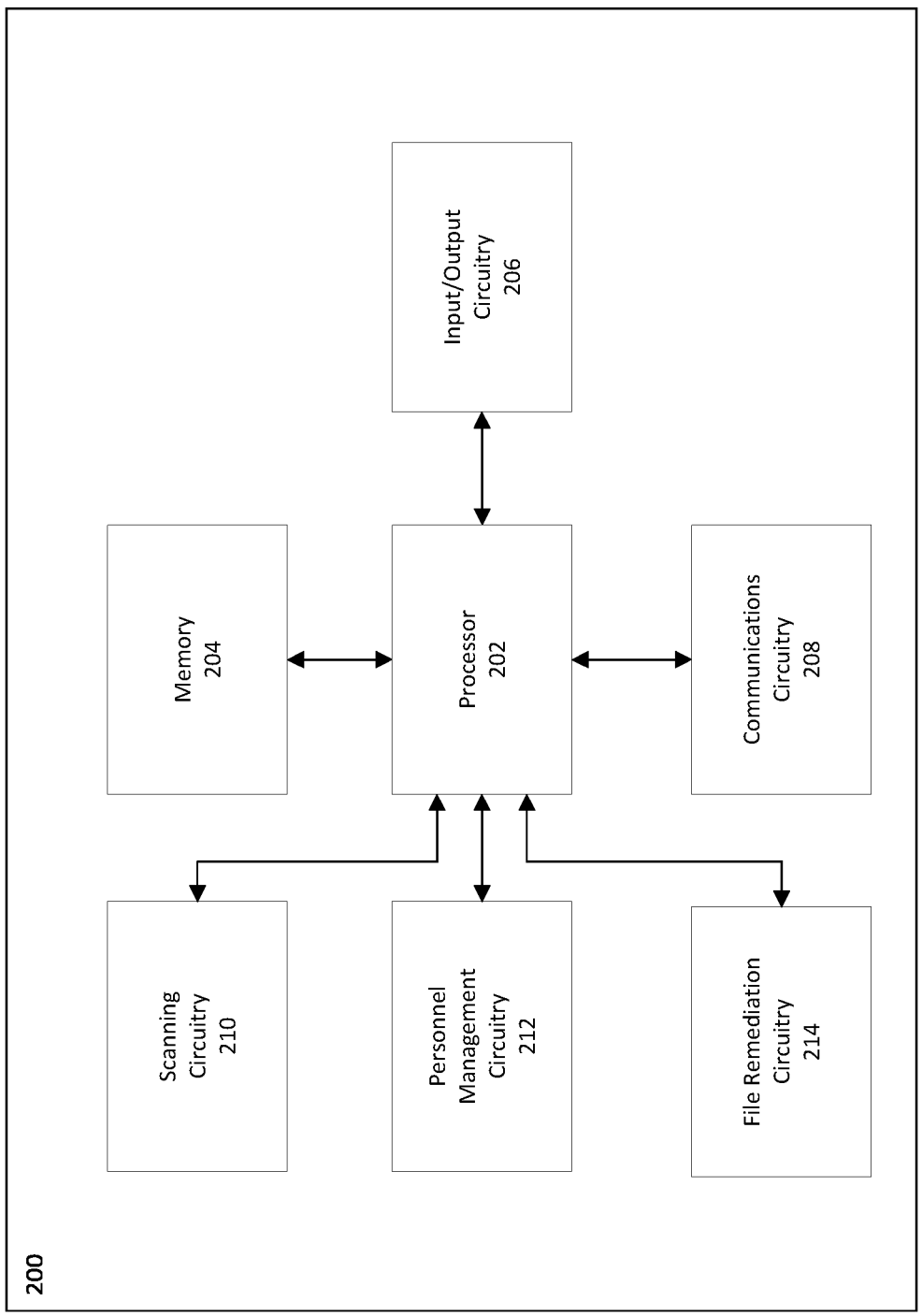
Figure 3:
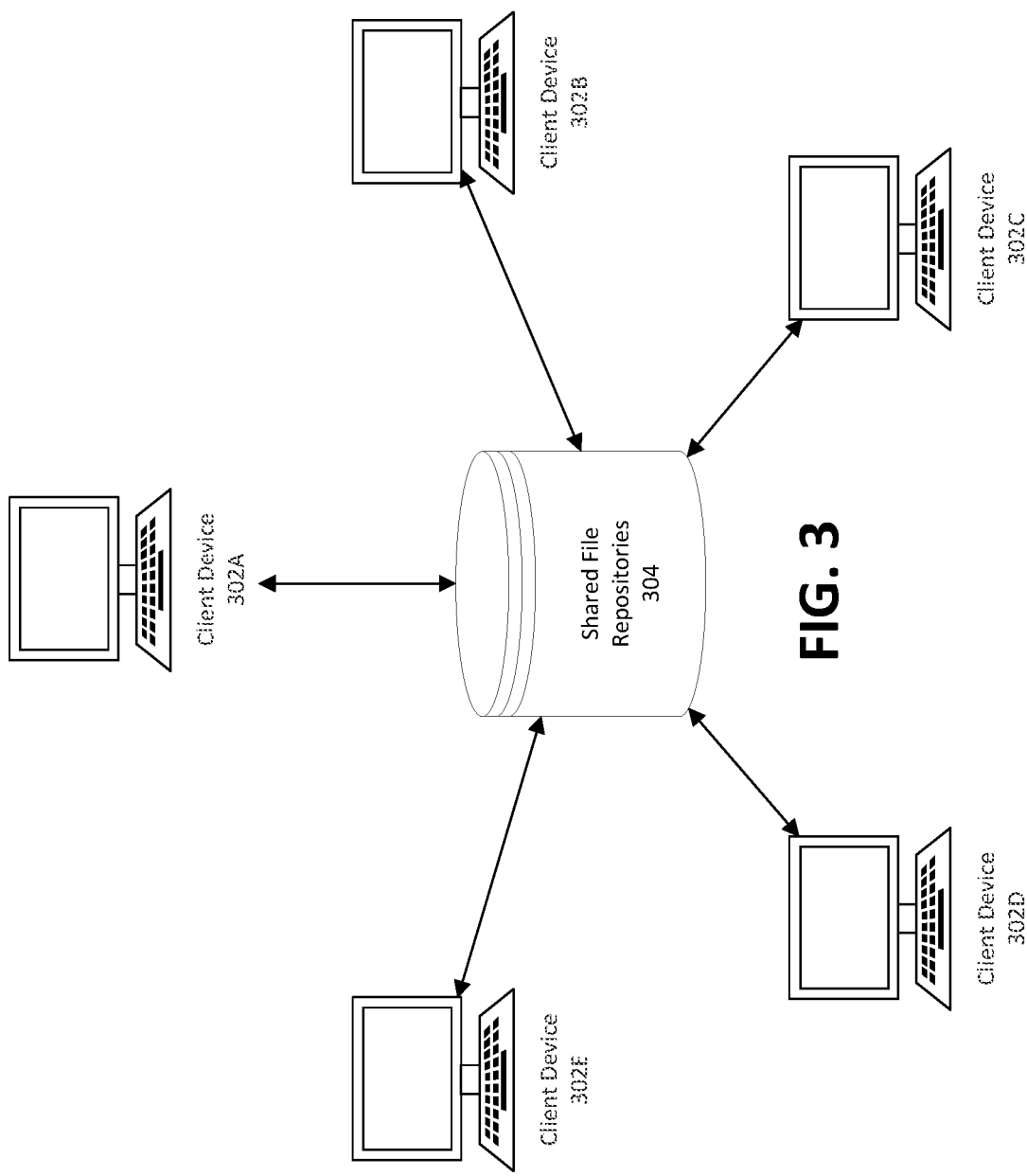
Figure 4:
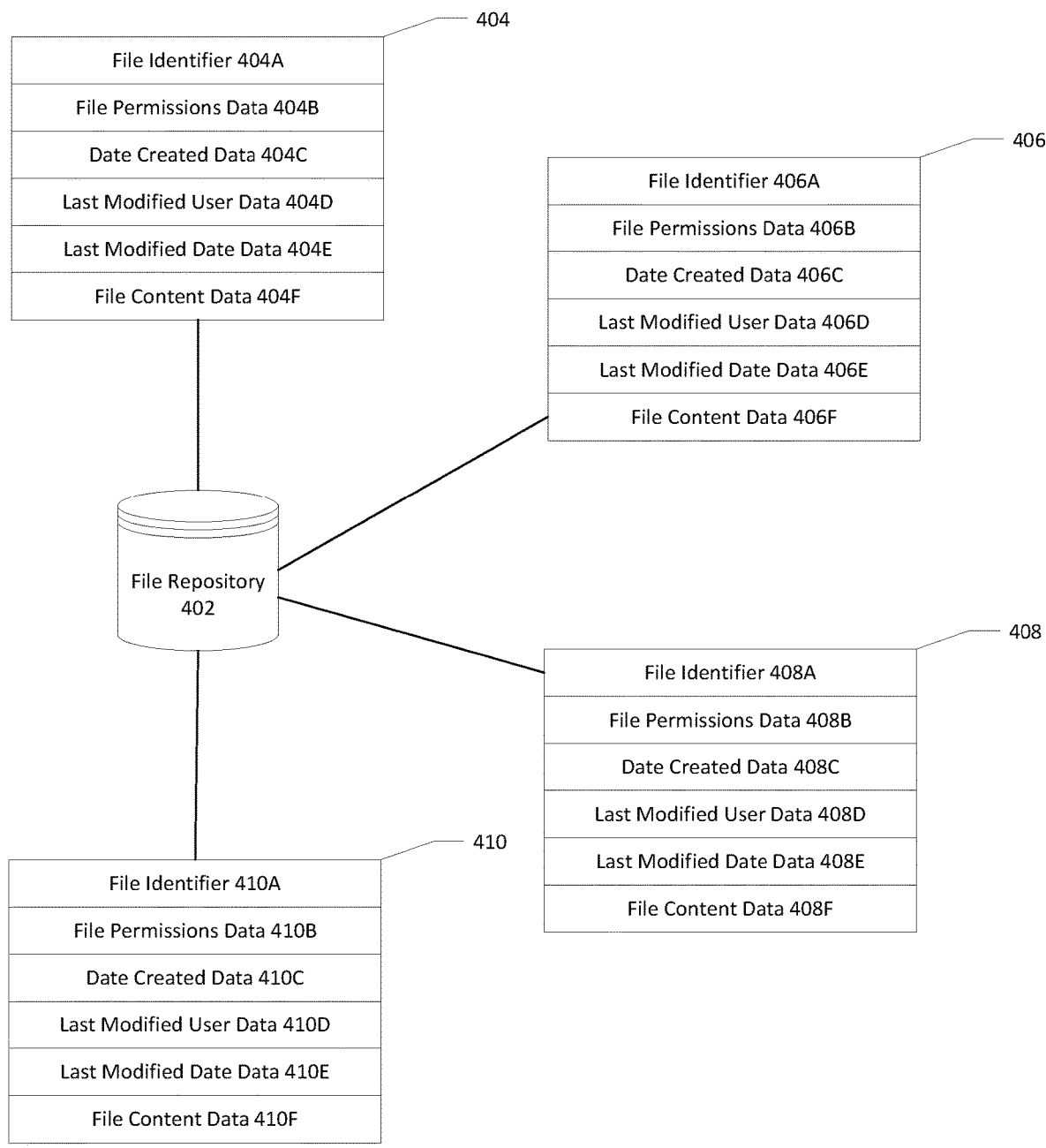
Figure 5:
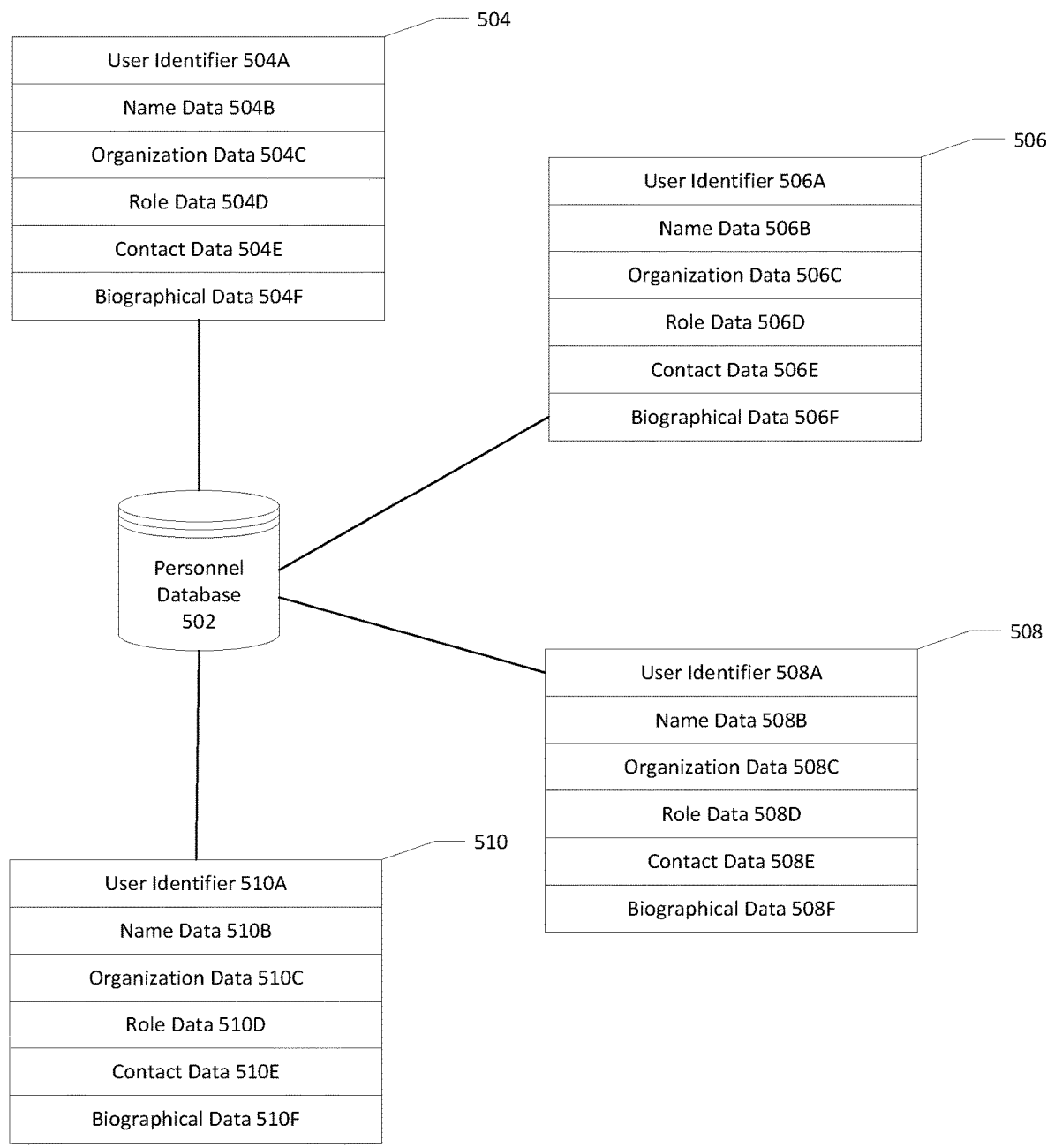
Figure 6:
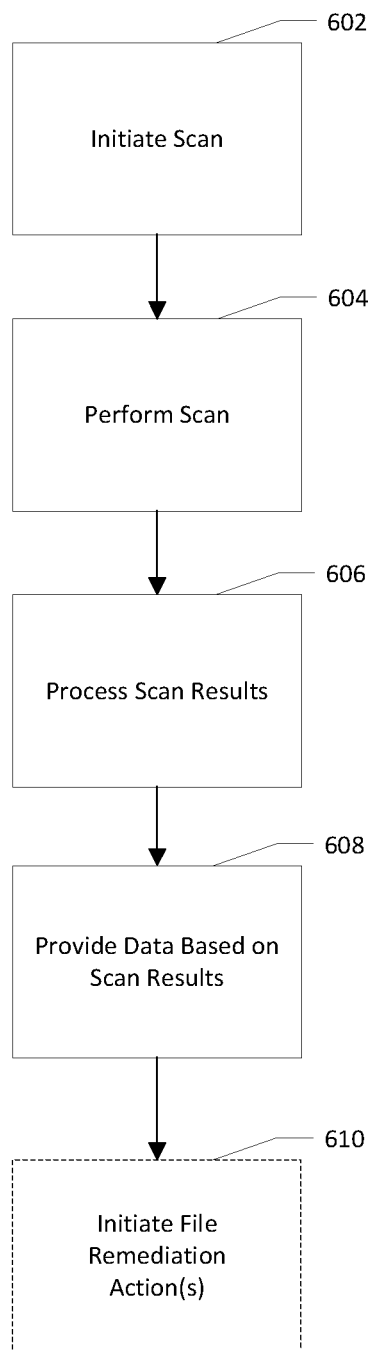
Figure 7:
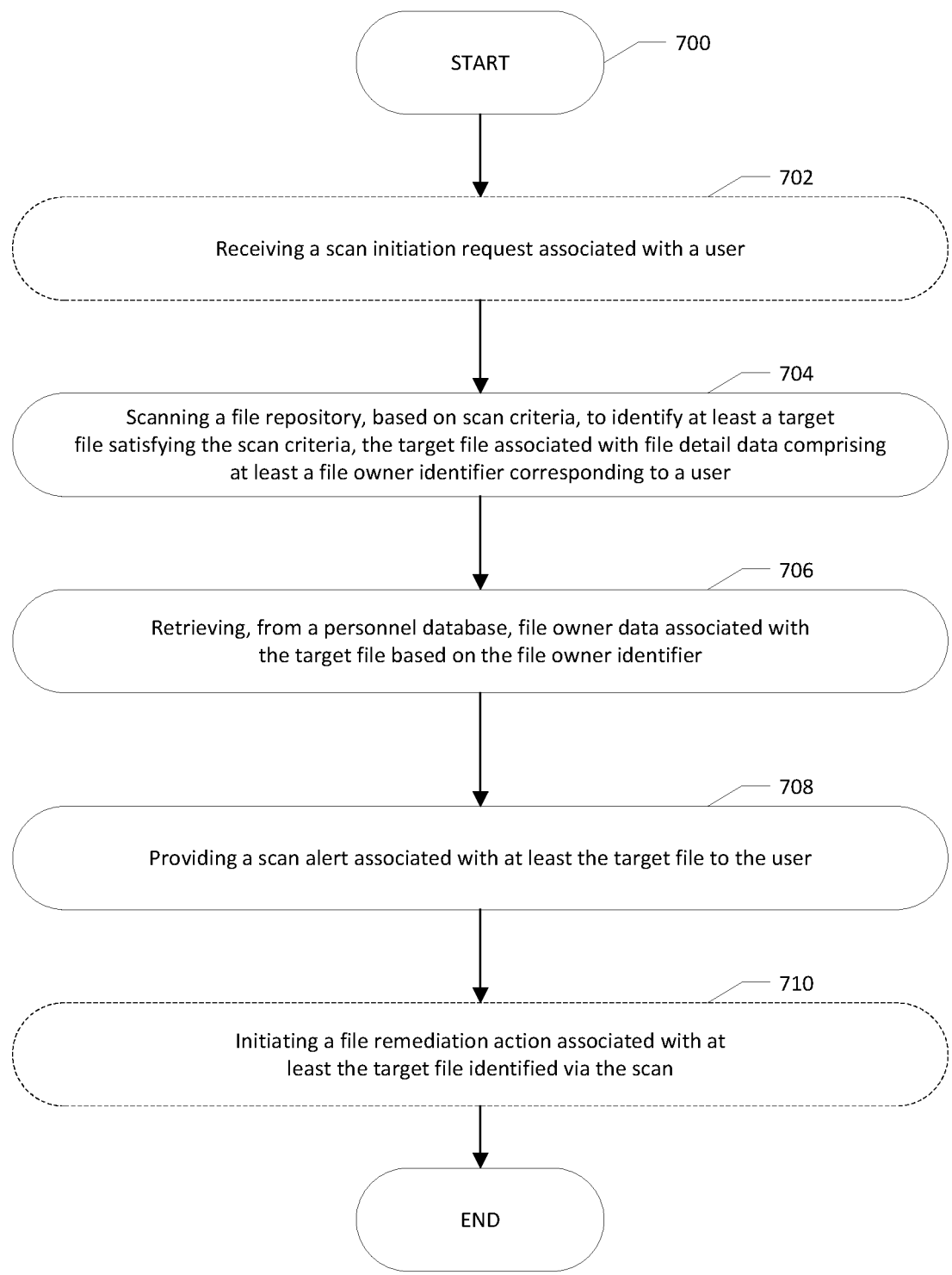
Figure 8:
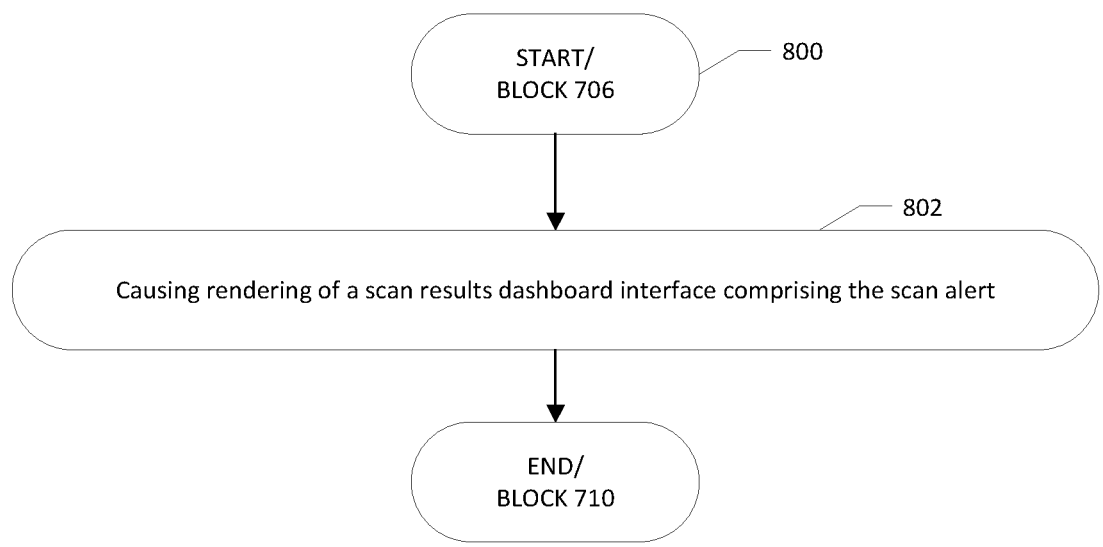
Figure 9:
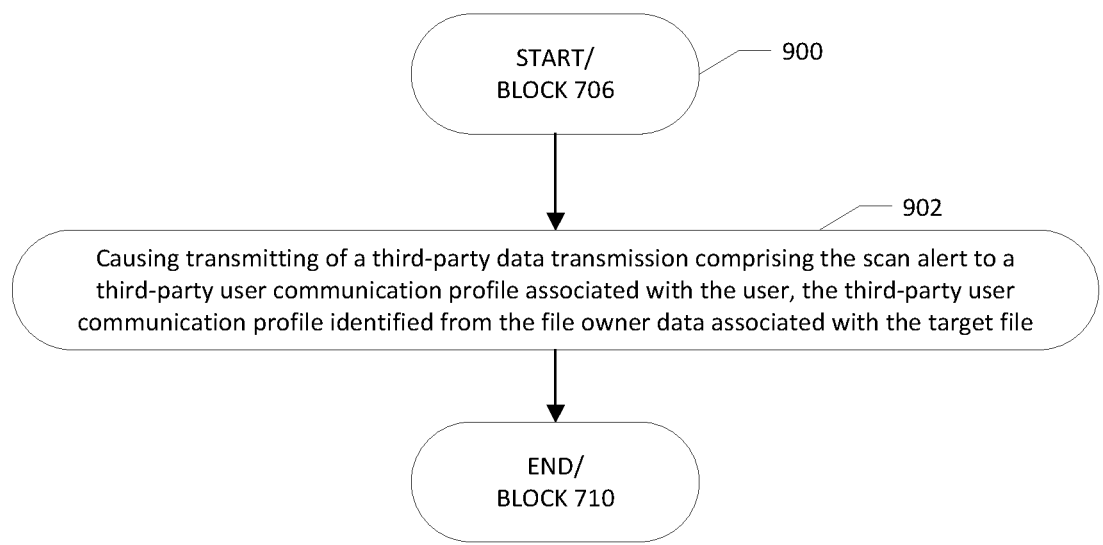
Figure 10:
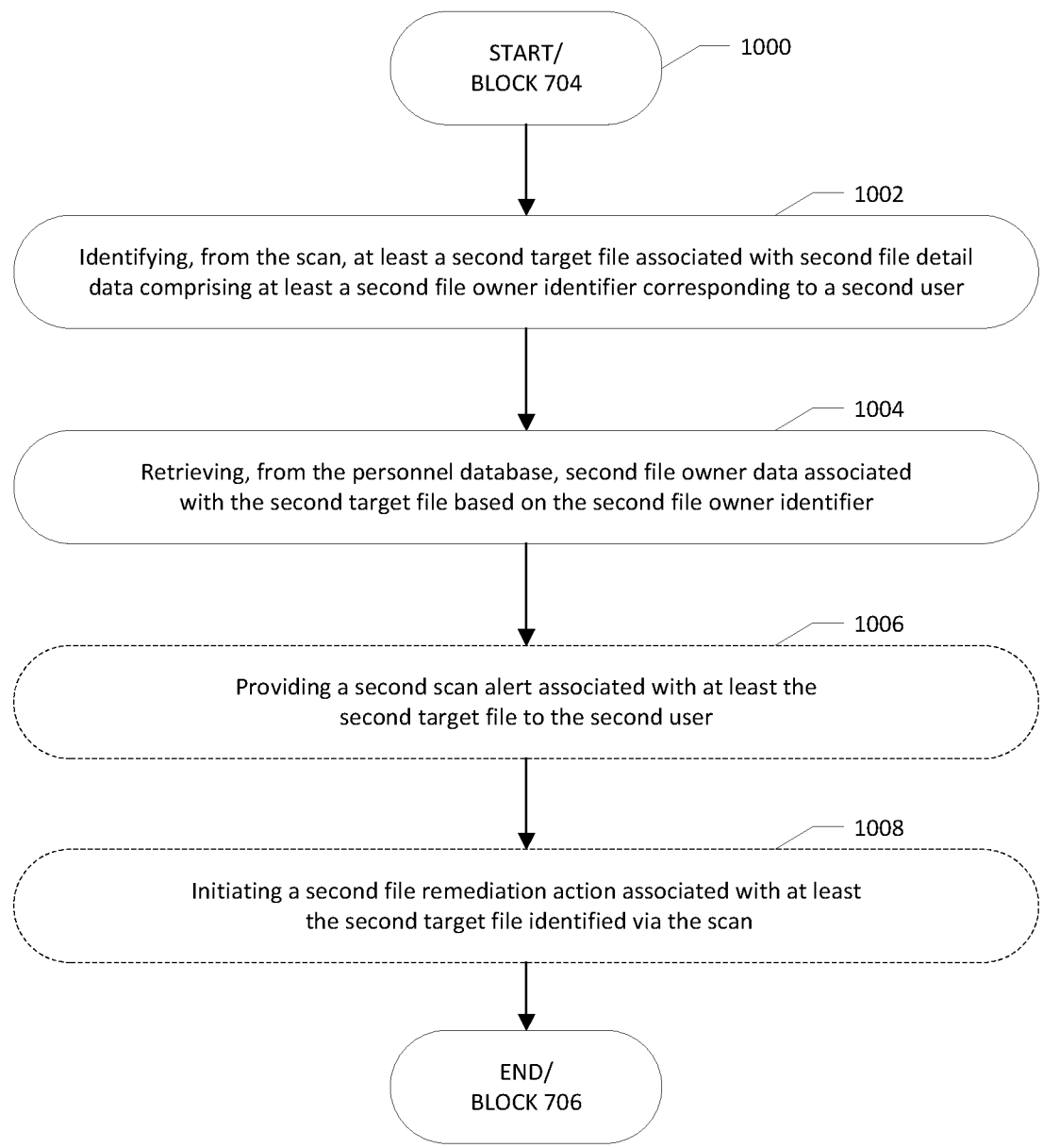

Having thus described the embodiments of the disclosure in general terms, reference now will be made to the accompanying drawings, which are not necessarily drawn to scale, and wherein:

FIG. 1 illustrates a block diagram of a system for improved target file scanning that may be specially configured within which embodiments of the present disclosure may operate;

FIG. 2 illustrates a block diagram of an example target file scanning apparatus that may be specially configured in accordance with an example embodiment of the present disclosure;

FIG. 3 illustrates a block diagram of example interactions between computing devices of an example data system for storing files in shared file repositories, in accordance with at least some example embodiments of the present disclosure;

FIG. 4 illustrates a visualization of data embodying or otherwise associated with file data objects stored in a file repository, in accordance with an example embodiment of the present disclosure;

FIG. 5 illustrates a visualization of data embodying or otherwise associated with user data objects stored in a personnel database, in accordance with at least an example embodiment of the present disclosure;

FIG. 6 illustrates a flowchart depicting example operations in an example process for improved file scanning and remediation, in accordance with at least an example embodiment of the present disclosure;

FIG. 7 illustrates a flowchart depicting example operations of another example process for improved file scanning and remediation, in accordance with at least an example embodiment of the present disclosure;

FIG. 8 illustrates a flowchart depicting additional example operations of an example process for improved file scanning and remediation, and specifically for causing rendering of a user interface based on a scan alert, in accordance with at least an example embodiment of the present disclosure;

FIG. 9 illustrates a flowchart depicting additional example operations of an example process for improved file scanning and remediation, and specifically for providing scan alert via third-party data transmission, in accordance with at least an example embodiment of the present disclosure; and FIG. 10 illustrates a flowchart depicting additional example operations of an example process for improved file scanning and remediation, and specifically for scanning and remediation for a second identified target file associated with a second user, in accordance with at least an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

During operation of a computing system, any number of files may be stored to one or more data repositories associated with or otherwise a part of such computing system. Such files may be stored for use by one or more users, such as for accessing via application(s) executed on one or more client devices of the computing system. In some contexts, however, the number of files stored to any particular computing system may grow significantly large. For example, over time and especially in complex and/or large-scale organizations, the amount of files stored can grow to millions, billions, or more of files.

The files stored to a particular computing system may be scanned and/or processed for any of a myriad of reasons. For example, operators responsible for maintaining the computing system may analyze the files on the computing system to maintain the security of the computing system and/or to improve the operational execution of the computing system (e.g., improve speed, increase available storage space, and/or the like). Such analysis often attempt to scan such files of the computing system for particular target files that meet particular criteria. In this regard, the scan may identify target files such that the target files may be displayed, further processed, and/or such that further actions may be performed for the target files for any of a myriad of reasons.

In some contexts, scanning of one or more computing systems poses particular technical challenges. For example, in particularly large data systems (e.g., those having millions, billions, or any significant amount of files stored), scanning operations can readily become prohibitively difficult to complete in an efficient and/or timely manner. Performing a detailed scan of each file makes it such that the full scanning operation would take prohibitively long to complete, or in some circumstances be computationally impossible to complete (e.g., would take longer than the allotted length of time to complete the scanning operation). The inventors have identified that an improved methodology for scanning for target files, and processing such target files identified as scan results, is desired. The inventors have further identified that an improved methodology for scanning for target files and processing such target files for large data systems (e.g., computing systems storing a significant amount of files) is desired.

Often, processing scan results faces additional technical deficiencies. For example, a user that initiated a scan is often provided the scan results despite the fact that such a user may not be permissioned or otherwise authorized to initiate changes in the storage of one or more target files identified in the scan results. Additionally, scan results may include multiple target files that each are associated with different users permissioned and/or otherwise authorized for initiating actions regarding the storage of the file (e.g., a "file owner"). often, the user initiating the scan is not the file owner for all target files, and systems performing a scan of a file system often lack capabilities that enables identification and/or communication with appropriate file owners for some or all of the identified target files resulting from the scan. Instead, such communications with the file owner(s) is commonly left to be performed manually by the user that initiated the scanning operation. This manual process is inefficient and prone to human error, which may result in target files remaining unaddressed unintentionally, improper remediation actions to be initiated for one or more files, and/or for further action to be delayed, thus unnecessarily exposing the computing system to continued risk.

Embodiments of the present disclosure provide for improved file scanning and remediation of data systems. In this regard, particular embodiments of the present disclosure scan one or more file repositories to identify target files that satisfy scan criteria in an effective and efficient manner. The scan may identify any amount of file detail data for such target files, including one or more identifiers uniquely identifying a file owner associated with each of the target file. Some embodiments utilize at least a portion of the scanned file detail data, for example a file owner identifier, to identify file owner data associated with the file owner of a particular target file. Such file owner data may include additional information corresponding to the file owner, such as user contact information that may be utilized to send one or more transmissions to the file owner. Some embodiments generate and/or otherwise provide a scan alert to the file owner. The scan alert may indicate one or more target files identified as associated with a particular file owner, and/or may be configured to enable initiation of one or more file remediation action(s) for such target file(s).

In some embodiments, embodiments perform a multi-phase scan that improves the overall throughput of the scanning operation to efficiently and accurately identify target files. For example, a first phase of the scanning operation may identify potential target files embodying a sub-candidate file set before subsequently performing a detailed scan of the potential target files. In this regard, the sub-set of potential target files may embody a significantly reduced set of files that may be much more efficiently processed via a detailed scan. Such embodiments improve the efficiency of such scanning operations while maintaining sufficient accuracy for identifying files that satisfy particular scan criteria.

Embodiments provide scan alerts, for example embodying interfaces, reports, determined data, and/or the like, to a user determined as a file owner for a particular target file resulting from a scanning operation. The scan alert may be provided to a file owner for display, consideration, and/or actioning by the file owner. Some embodiments leverage one or more specially configured database(s), such as personnel database(s) to provide a scan alert to a user identified as a particular file owner. In this regard, such specially configured database(s) may be leveraged to enable transmission of data to an appropriate user for each particular target file. Further, such embodiments enable transformation of file detail data scanned from a particular target file for use in providing a corresponding scan alert associated with the target file. Conventional implementations fail to utilize scanned data associated with any file for such purposes.

In one example context, a scanning operation is initiated for a particular purpose, for example to determine whether one or more file repositories of a computing system include files embodying an End-User Computing Tool (EUCT). User Andy may initiate a scan of particular file repositories of a computing system via a specially configured computing device embodying an embodiment of the present disclosure. User Andy may transmit one or more scan initiation request (s) including various parameters for the scan, for example scan criteria to be utilized for the scanning operation, file repositories to be scanned during the scanning operation, and/or the like as input by User Andy or automatically determined.

The scan may identify, via one or more scanning phases, particular file detail data for all candidate data objects within the file repositories being scanned. For example, the file detail data for each candidate data object identified in the file repository may be compared to the scan criteria to determine whether the scan criteria is satisfied. Each file determined to satisfy the scan criteria may be identified as a target file.

Some or all of the file detail data for each identified target file is utilized to provide a scan alert a file owner for each identified target file. For example, embodiments of the present disclosure may identify a file owner identifier from the file detail data associated with a particular target file (e.g., an identifier of a user that last accessed the file, an identifier of a user that created the file, and/or the like). The file owner identifier is utilized to retrieve file owner data associated with the file owner for a particular target file from a personnel database. For example, the computing device embodying an embodiment of the present disclosure may be communicable with or otherwise include one or more personnel database(s), and the computing device may query the personnel database(s) based on the file owner identifier to retrieve file owner data corresponding to the file owner for the particular target file.

The file owner data may be utilized to provide a scan alert to each file owner of a target file. For example, the file owner data for each file owner associated with a target file may include particular information utilized to provide the scan alert to the file owner via one or more specially configured transmissions. The file owner data may include user communication information that identifies one or more computing devices, account(s), and/or the like associated with the file owner. In this regard, the user communication information may be utilized to transmit one or more specially configured messages, provide one or more specially configured user interfaces, and/or otherwise cause rendering of data embodying or associated with the scan alert for review and/or actioning by the file owner.

In some example contexts, the file owner may utilize the scan alert for any of a myriad of purposes. For example, in some embodiments, the file owner may access the information included in the scan alert (e.g., all files listed as satisfying the scan criteria). Additionally or alternatively, in some embodiments, the file owner may make one or more decisions based on such information in the scan alert and/or initiate one or more actions in response. For example, in some embodiments, the file owner may initiate one or more file remediation actions based on the information in the scan alert. User Andy, for example, may receive a scan alert indicating file detail data associated with each target file identified as satisfying scan criteria for a particular scan. User Andy may, based on the file detail data in the scan alert, initiate file remediation actions determined appropriate to properly maintain the corresponding target file in the data system. For example, User Andy may determine that a first target file in a particular data repository should remain in place, a second target file in the same particular data repository or in another data repository should be deleted, and a third target repository in the same data repository or in another data repository should be moved to a different data repository intended for storing particular categories of data files (e.g., an EUCT repository). In circumstances where User Bob, for example, is identified as a file owner for one or more other target files, User Bob may be provided a second scan alert associated with such target files.

Such embodiments of the present disclosure provide a myriad of technical advantages in the field of data scanning and data storage. For example, some embodiments utilize a multi-phase scanning operation to enable scanning of large data systems. Additionally or alternatively, by enabling accurate identification of a file owner for any particular file stored in a particular data repository and/or identification of file owners for various files stored in any number of data repositories, some embodiments enable any number of scan alerts to be provided to appropriate users that are permissioned and/or otherwise authorized to view information associated with the file(s) and/or perform appropriate file remediation action(s). For example, additionally or alternatively, some such embodiments enable scan alert(s) to be provided to each appropriate file owner associated with at least one target file identified via a scanning operation, such that each file owner may efficiently and effectively initiate file remediation action(s) for target file(s) that the file owner is intended to maintain. Such embodiments reduce the amount of computing resources that would be wasted in providing scan alerts to incorrect users not permissioned, authorized, or otherwise appropriate for receiving information associated with scan result(s) and/or initiating remediation of such file(s). Such embodiments further advantageously reduce and/or eliminate manual steps that conventionally are utilized to ensure that each correct file owner is made aware of scan results associated with the file owner and/or to ensure that each correct file owner may initiate action(s) for such scan results. Some embodiments that automatically initiate actions for one or more target file(s), such as file remediation action(s), further eliminate manual steps that would otherwise be performed by a user (e.g., a file owner of target file(s)) and save computing resources associated with enabling initiation of such action(s) manually.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "set" with respect to a particular type of data (e.g., a "set of data X" or a "data X set") refers to one or more data objects embodying or including any number of instances of the particular data set. For example, as described herein, a set of candidate files may include any number of candidate data objects, a set of scan criteria may include any number of individual scan criteria and the like.

The term "data system" refers to one or more computing devices embodied in hardware, software, firmware, and/or a combination thereof, that includes one or more data repositories accessible via client devices included in or that communicate with such computing devices. In some embodiments, file repositories of a particular system are interconnected such that client devices accessing the data system have access to some or all of the file repositories embodying part of the data system.

The term "file repository" refers to a specially configured database, memory, and/or other storage space embodied in hardware, software, firmware, and/or a combination thereof, that stores one or more files. Non-limiting examples of a file repository include a specially configured generic server device, database server, virtual server, cloud server, and a memory device local or connected to a client device.

The term "shared file repository" refers to a file repository accessible by various users corresponding to client device(s) interacting with or within a particular data system. In some such embodiments, all client devices having access to a shared file repository may be associated with particular permissions indicating whether each client device may read files stored to the shared file repository, and/or write files to the shared file repository. In some embodiments, a shared file repository is accessible to various client devices over one or more communications networks.

The term "user" refers to electronically managed data representing a particular entity, for example a person, business, group of persons, and/or other organization. In some embodiments, a user is represented by electronically managed data corresponding to a user account or user profile for the user.

The term "scan criteria" refers to refers to a comparison, model, or algorithm that outputs data indicating a particular candidate file embodies a target file, or indicates a likelihood of a particular candidate file embodying a target file, based on data value(s) for particular data properties of the target file.

The term "candidate file" refers to electronically managed data embodying a file stored to at least one file repository that is to be processed as part of a file scanning process. In some embodiments, candidate file(s) are stored in a particular file repository being scanned via a file scanning process. or is not likely to embody or include a target file.

The term "target file" refers to refers to electronically managed data embodying a file associated with particular data properties that satisfy particular scan criteria corresponding to a file scanning process.

The term "file content data" refers to a portion of electronically managed data for a file that is modifiable by a user via functionality provided by a particular user-facing application. Non-limiting examples of file content data include text and/or image data in a word processor application, cell data in a spreadsheet management application, and database processing queries in a database management application.

The term "data property" with respect to a particular file refers to a particular portion of metadata associated with the file or a particular portion of the content of a file. Each data property for a file may be associated with a particular data value, which may differ for each file depending on the metadata and/or content data of the file. Non-limiting examples of a data property for a particular file include a filename, a file type, a file content length, a file size, a file content title, a file author, a last-accessed datetime, a file created datetime, a file storage location, and file permissions data.

The term "file detail data" refers to electronically managed data representing any number of data properties of a particular file and/or associated values for such data properties. It should be appreciated that file detail data may be embodied in a single data object comprising one or more data properties and corresponding data value(s), and/or multiple data objects.

The term "file owner identifier" refers to electronically managed data that uniquely represents a user responsible for management of a particular file stored to a file repository. Non-limiting examples of a file owner identifier include NTFS permission data that uniquely identifies a user associated with the file repository.

The term "file permissions data" refers to electronically managed data representing permissions for particular users and/or associated user accounts that are granted permissions to access, alter, update, interact with, and/or otherwise affect a particular file or group of files. In some embodiments, file permissions data identifies particular users and/or associated user accounts that are granted permissions to access, alter, update, interact with, and/or otherwise affect all file(s) in a particular file repository. Non-limiting examples of file permissions data include NTFS access permissions, read/write permissions, and other operating system-level file or repository management permissions.

The term "file authorship data" refers to electronically managed data representing an author associated with a particular file. Non-limiting examples of a file authorship data includes data indicating a user that last modified a file, data indicating a user that created a file, and/or data indicating a group of users that have edited the file.

The term "file owner data" refers to electronically managed data representing information associated with a user embodying an administrator and/or other manager for storage of a particular file and/or file repository storing any number of files.

The term "file repository" refers to one or more computing device(s) embodied in hardware, software, firmware, and/or a combination thereof, that is configured to store any number of files. In some embodiments, a file repository embodies one or more folders or sub-folders of a particular file system.

The term "personnel database" refers to one or more computing device(s) embodied in hardware, software, firmware, and/or a combination thereof, configured to store user information associated with any number of user(s). Non-limiting examples of user information stored in a personnel database include a user identifier (e.g., embodying a file owner identifier), a name for a user, a birthdate for a user, contact information for a user (e.g., an email, phone number, social media handle, and/or the like), a role associated with the user, an organization associated with the user, and a connection between a user and one or more other users (e.g., data indicating a user's superior in an organizational hierarchy). In some embodiments, the information stored in a personnel database for a particular user includes file owner data corresponding to the user.

The term "scan alert" refers to user-facing electronically managed data representing one or more files that satisfied scan criteria of a particular scanning operation. Non-limiting examples of the scan alert include one or more user interfaces and/or sub-interfaces rendered to a native application associated with a particular system, a communication message rendered via a third-party application associated with a system, and stored data representing the file(s).

The term "scan results dashboard interface" refers to a user interface including one or more interface elements representing each file determined to satisfy scan criteria of a particular scanning operation. In some embodiments, a scan results dashboard interface is rendered via a user-facing application associated with a particular system performing the scanning operation.

The term "file remediation action" refers to one or more file-driven actions for managing the storage of one or more target file(s) determined to satisfy particular search criteria. Non-limiting examples of a file remediation action include a file movement action to move a file from one storage location to another (e.g., a first file repository to a second file repository), a file deletion action to delete the file from a particular storage location, and a file leave action to leave the file in the particular storage location that it is currently stored in.

The term "user interaction" refers to one or more user-performed action(s) providing input to a particular computing device. Non-limiting examples of a user interaction include a user tap, swipe, gesture, or other physical touch with a touch-adaptive display, a keyboard press, a mouse click, a peripheral engagement, a voice command, a physical movement of the computing device, a video-detected gesture, an electrical signal, and user engagement of particular hardware.

The term "third-party data transmission" refers to electronically managed data representing a specially configured transmission from a third-party system including a scan alert associated with at least one target file, where the third-party data transmission is accessible via a particular user-facing application associated with the third-party system. Non-limiting examples of a third-party data transmission and third-party system include a social media post or message transmitted made available to a particular user via a social networking platform, an email message made available to a particular user via an email application, and a push notification made available through an operating system of a client device associated with the particular user.

The term "third-party user communication profile" refers to electronically managed data that uniquely identifies a particular user registered with and maintained by a third-party system separate from a system configured to provide file scanning functionality as described herein. Non-limiting examples of a third-party user communication profile include a social media profile uniquely identified by a social media profile identifier for a user, an email account uniquely identified by an email address for a user, and a phone profile uniquely identified by a phone number for a user.

Example Systems and Apparatuses of the Disclosure

FIG. 1 illustrates a block diagram of a system for improved target file scanning that may be specially configured within which embodiments of the present disclosure may operate. As illustrated, the system for improved target file scanning includes a target file scanning system 102, a data system 104, and at least one client device, such as the client device 106. Additionally or alternatively, in some embodiments, the target file scanning system 102, data system 104, and client device 106 communicate over one or more communications network(s), such as the communications network 108 as depicted and described herein. In this regard, the various devices and systems depicted and described with respect to FIG. 1 may communicate to provide the improved target file scanning functionality described herein.

Client device 106 includes one or more computing devices embodied in hardware, software, firmware, and/or the like, or a combination thereof, accessible to a user for accessing particular functionality provided by the data system 104 and/or the target file scanning system 102 alone or in conjunction with the other devices and/or systems depicted and described. In this regard, the client device 106 may be associated with any number of user-facing applications that each enable access to different functionality and/or access to different external system(s). For example, in some embodiments, the client device 106 may utilize various user-facing applications that perform functionality that enables storage of one or more file(s) to the data system 104, such as word processing application(s), browser application(s), database management application(s), and/or the like. The client device 106 may at least be configured to utilize a user-facing application associated with the target file scanning system 102, for example to interact with the target file scanning system 102 to access and initiate file scanning and remediation functionality described herein. In some embodiments, the user-facing applications accessible via the client device 106 are downloaded and/or installed to the client device 106.

In some embodiments, the client device 106 comprises an edge terminal (e.g., a user's workstation, personal computer, mobile device, and/or the like) that is configured to communicate with the data system 104 via a particular network. Alternatively or additionally, in some embodiments, the client device 106 is a part of the data system 104. Non-limiting examples of a client device 106 include a smartphone, a mobile device, a personal computer, an enterprise terminal, and/or the like, that utilize a specially configured software application to perform the improved target file scanning functionality described herein. In some embodiments, the client device 106 is specially configured to execute a user-facing application that provides access to such functionality natively and/or via any number of application programming interface (API) calls or other request transmissions to one or more external systems, such as the target file scanning system 102 and/or data system 104.

Data system 104 includes one or more computing devices embodied in hardware, software, firmware, and/or the like, or a combination thereof, each configured to at least store files in one or more file repositories. The file repositories of the data system 104 are accessible by one or more users via corresponding client device(s). In some embodiments, the data system 104 is specially configured to provide additional functionality separate to the storage and/or maintenance of files on one or more data repositories. For example, in some embodiments, the data system 104 additionally includes one or more application servers, specially configured computing devices that perform particular processing functionality, and/or the like. Such additional functionality may interact with and/or integrate the data repositories embodying the data system 104.

As illustrated, the data system 104 includes a plurality of file repositories 104A-104F. Each of the file repositories 104A-104F may be specially configured to store any number of files and/or associated data. For example, in some embodiments, each of the file repositories 104A-104F embodies a separate virtual or physical memory space that defines the location to which such files are to be stored.

Each file repository 104A-104F may include any number of sub-repositories, folders, and/or the like that further defines the structure of stored data within the file repository. For example, in some embodiments, a file repository may be specially configured to define a particular file system that organizes stored files in one or more particular location(s). In some embodiments, one or more users (e.g., administrators or in some embodiments other users) may alter the configuration of one or more file repository and/or the file system defined therein.

In some embodiments, the data system 104 includes one or more shared file repositories. A shared file repository may store files created and/or otherwise stored by any number of users. In this regard, the files saved to a shared file repository may be accessible to all client devices authorized for communication with the data system 104 and/or the particular shared file repository. In this regard, for example, in an instance where a user utilizing the client device 106 has access to the shared file repository, the user may select files to retrieve from the shared file repository to access them and/or write files to the shared file repository.

In an example context, for example, the file repositories 104A, 104B, 104C, 104D, 104E, and/or 104F may each represent shared file repositories for use by different groups of users, organizations, sub-organizations of an entity, and/or the like. In this regard, users that authenticate themselves via their corresponding client device 106 may gain access to one or more particular shared file repositories with which the user is permissioned to access. In some such embodiments, the user may utilize the client device 106 to access the files stored to locations on the shared file repository, for example a shared file repository associated with the user's particular business unit, and/or access shared file repositories for groups to which the user is a member. In this regard, it should be appreciated that the user of the client device 106 may interact with the data system 104 to perform any number of actions associated with functionality provided by the data system 104 and/or to access and/or utilize files stored to one or more of the file repositories 104A-104F, such as to open files, move files, load file data, download files, send files, store files, and/or the like.

The target file scanning system 102 includes one or more specially configured computing devices configured in hardware, software, firmware, and/or the like, or a combination thereof, to initiate and/or perform various operations associated with the improved target file scanning functionality described herein. For example, in some embodiments, the target file scanning system 102 communicates with the data system 104 to initiate and/or perform scanning particular file repositories of the data system 104. The scanning may be initiated via the target file scanning system 102 and/or via the client device 106, for example in response to user interaction requesting the scan. The target file scanning system 102 may determine whether one or more of the candidate files embodies a target file based on particular scan criteria. In this regard, the target file scanning system 102 may include any number of database servers, application servers, personal computing devices, networking devices, and/or the like that are specially configured to perform the functionality described herein.

In some embodiments, the target file scanning system 102 is communicable with the client device 106 to enable a user of the client device 106 to initiate a scan of the data system 104 and/or receive data associated with an initiated scan. For example, in some embodiments, the user of the client device 106 initiates a client-facing application that enables access to one or more user interfaces for generating and/or transmitting a scan initiation request that causes initiation of a file scanning operation as described herein. Additionally or alternatively, in some embodiments, the target file scanning system 102 includes one or more computing devices (e.g., application servers and/or corresponding database servers, and/or the like) that access the data system 104 to identify candidate files in the various file repositories 104A-104F.

Additionally or alternatively, in some embodiments, the target file scanning system 102 includes one or more computing devices (e.g., application servers and/or corresponding database servers, and/or the like) that scan some or all of the candidate files to determine whether such files satisfy scan criteria. In some embodiments, for example, the target file scanning system 102 may include one or more computing devices specially configured to identify a reduced set of candidate files for scanning utilizing the improved methodologies described herein.

It should be appreciated that, in some embodiments, the target file scanning system 102 is controlled, operated, and/or otherwise owned by the same entity that controls, operates, and/or otherwise owns the data system 104. In other embodiments, the target file scanning system 102 is controlled, operated, and/or otherwise owned by a different entity from the data system 104. For example, in some embodiments, the target file scanning system 102 provides a cloud service for scanning external data systems to which it is granted access (e.g., as a software-as-a-service platform) by third-party entities controlling such external data systems. Similarly, in some embodiments, the data system 104 embodies a cloud storage service having files identified and scanned by the target file scanning system 102.

In some embodiments, the target file scanning system 102 performs the improved scanning functionality described herein at particular times. For example, in some embodiments, the target file scanning system 102 initiates scanning of one or more file repositories of the data system 104 at predetermined intervals (e.g., daily, weekly, quarterly, and/or the like). In other embodiments, the target file scanning system 102 initiates scanning of one or more of the file repositories of the data system 104 in response to user engagement via the client device 106 requesting or otherwise initiating such a scan. In yet other embodiments, the target file scanning system 102 performs one or more determinations and initiates such scanning of one or more file repositories of the data system 104 in response to such determinations. For example, the target file scanning system 102 may determine that a threshold number of file updates, saves, and/or accesses have been performed, and initiate the scan as described herein upon such determinations.

In some embodiments, the target file scanning system 102 and the client device 106 are embodied in a single, specially configured computing device. For example, in some embodiments, the client device 106 includes specially configured software and/or firmware (e.g., a specially configured executable application) that embodies the target file scanning system 102. The specially configured executable application may be installed to the client device 106 and executed by the user to perform the functionality of the target file scanning system 102.

The communications network 108 comprises any combination of computing devices embodying a public, private, and/or hybrid computing network over a particular range. In some embodiments, the communications network 108 is embodied by one or more network access points, relays, base stations, data transmission devices, cellular communication towers, and/or other communication devices. In some embodiments, the communications network 108 includes any number of non-user computing devices facilitating access to and/or embodying a public network, such as the Internet. Additionally or alternatively, in some embodiments, the communications network 108 includes one or more computing devices of a user's local network, for example one or more network access point(s) such as a modem and/or router that enable access to a public, private, or hybrid network of computing devices. It should be appreciated that communications network 108 may be accessible via any of a myriad of communication mechanisms and/or protocols, including without limitation a wired connection, a Wi-Fi connection, a cellular connection, Bluetooth, and/or the like.

FIG. 2 illustrates a block diagram of an example target file scanning apparatus that may be specially configured in accordance with an example embodiment of the present disclosure. In some embodiments, the target file scanning system 102 is embodied by one or more computing systems, such as the target file scanning apparatus 200 as depicted and described in FIG. 2. The target file scanning apparatus 200 includes processor 202, memory 204, input/output circuitry 206, communications circuitry 208, scanning circuitry 210, personnel management circuitry 212, and file remediation circuitry 214. The target file scanning apparatus 200 may be configured, using one or more of the sets of circuitry 202, 204, 206, 208, 210, 212, and/or 214, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the target file scanning apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the target file scanning apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the target file scanning apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the target file scanning apparatus 200, and/or one or more remote or "cloud" processor(s) external to the target file scanning apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations associated with improved file scanning and remediation functionality, for example as described with respect to the target file scanning system 102 and/or as described further herein. In some embodiments, the processor 202 includes hardware, software, firmware, and/or a combination thereof, that receives a scan initiation request from a user. Additionally or alternatively, in some embodiments, the processor 202 includes hardware, software, firmware, and/or a combination thereof, that identifies a plurality of candidate files associated with one or more file repositories, and/or a reduced set of candidate files. Additionally or alternatively, in some embodiments, the processor 202 includes hardware, software, firmware, and/or a combination thereof, that performs an initiated scan operation based on one or more scan criteria to identify target files satisfying the scan criteria. Additionally or alternatively, in some embodiments, the processor 202 includes hardware, software, firmware, and/or a combination thereof, that processes scan results, such as to provide scan alert(s) associated with the identified target files that satisfy the scan criteria, output particular user interface(s), generate report(s) based on the identified target file(s), and/or the like. Additionally or alternatively, in some embodiments, the processor 202 includes hardware, software, firmware, and/or a combination thereof, that causes initiation and/or performs an initiated file remediation action, for example to alter the storage of a particular target file.

In some embodiments, the target file scanning apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 may be any means such as a device or circuitry embodied in either hardware or a combination of hardware and software that is configured to receive and/or transmit data from/to a network and/or any other device, circuitry, or module in communication with the target file scanning apparatus 200. In this regard, the communications circuitry 208 may include, for example, a network interface for enabling communications with a wired or wireless communications network. For example, the communications circuitry 208 may include one or more network interface card(s), antenna(s), bus(es), switch(es), router(s), modem(s), and supporting hardware, firmware, and/or software, or any other device suitable for enabling communications via one or more communications network (s). Additionally or alternatively, the communications circuitry 208 may include circuitry for interacting with the antenna(s) and/or other hardware or software to cause transmission of signals via the antenna(s) or to handle receipt of signals received via the antenna(s).

The scanning circuitry 210 includes hardware, software, firmware, and/or a combination thereof, configured to support various functionality associated with identifying and scanning files in particular file repositories and/or file detail data associated with such files. For example, in some embodiments, the scanning circuitry 210 includes hardware, software, firmware, and/or a combination thereof, configured to identify a plurality of candidate files associated with one or more file repositories. Additionally or alternatively, in some embodiments, the scanning circuitry 210 includes hardware, software, firmware, and/or a combination thereof, configured to identify a reduced set of candidate files stored by one or more file repositories. Additionally or alternatively, in some embodiments, the scanning circuitry 210 includes hardware, software, firmware, and/or a combination thereof, configured to determine one or more target files by identifying files that satisfy the scan criteria. In some embodiments, the target files may be identified from a candidate file set, or a reduced candidate file set, as described herein. Additionally or alternatively, in some embodiments, the scanning circuitry 210 includes hardware, software, firmware, and/or a combination thereof, configured to generate a target likelihood score for each candidate file in the reduced set of candidate files, where the target likelihood score represents a probability the candidate data object embodies a target file.

Additionally or alternatively, in some embodiments, the scanning circuitry 210 includes hardware, software, firmware, and/or a combination thereof, configured to identify file detail data associated with one or more files, such as target files determined to satisfy scan criteria. Additionally or alternatively, in some embodiments, the scanning circuitry 210 includes hardware, software, firmware, and/or a combination thereof, to extract and/or process particular data values from the file detail data. For example, in some embodiments, the scanning circuitry 210 includes hardware, software, firmware, and/or a combination thereof, configured to extract at least a file owner identifier corresponding to a user for a particular file, such as a target file, identified via the scan.

In some embodiments, the scanning circuitry 210 performs one or more of the above-mentioned actions using, in whole or in part, the communications circuitry 208, input/output circuitry 206, and/or processor 202. For example, the scanning circuitry 210 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, scanning circuitry 210 may include a separate processor, specially configured field programmable gate array (FPGA), or a specially programmed application specific integrated circuit (ASIC).

The personnel management circuitry 212 includes hardware, software, firmware, and/or a combination thereof, configured to support various functionality for providing data associated with a target file to a user corresponding to the target file. For example, in some embodiments, the personnel management circuitry 212 includes hardware, software, firmware, and/or a combination thereof, configured to access and/or maintain a personnel database including various data associated with one or more users. Additionally or alternatively, in some embodiments, the personnel management circuitry 212 includes hardware, software, firmware, and/or a combination thereof, configured to retrieve, from a personnel database, file owner data associated with a target file. Additionally or alternatively, in some embodiments, the personnel management circuitry 212 includes hardware, software, firmware, and/or a combination thereof, configured to access the personnel database to retrieve file owner data associated with any number of file owner identifiers corresponding to any number of different users. Each of the users may be associated with different user information, such as a different user role, business unit, contact information, and/or the like. Additionally or alternatively, in some embodiments, the personnel management circuitry 212 includes hardware, software, firmware, and/or a combination thereof, configured to provide a scan alert associated with at least one target file to a user. For example, in some embodiments, the personnel management circuitry 212 includes hardware, software, firmware, and/or a combination thereof, configured to provide the scan alert to the user utilizing file owner data identified based on a file owner identifier extracted from the file detail data. The personnel management circuitry 212 may provide a scan alert, for example, to a user via a user-facing application associated with the target file scanning system 102, for example, or via a third-party application associated with an external system. Additionally or alternatively, in some embodiments, the personnel management circuitry 212 includes hardware, software, firmware, and/or a combination thereof, that generates the scan alert for providing to one or more users. The scan alert may include data representing or otherwise associated with any number of target files.

In some embodiments, the personnel management circuitry 212 performs one or more of the above-mentioned actions using, in whole or in part, the communications circuitry 208, input/output circuitry 206, and/or processor 202. For example, the personnel management circuitry 212 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, personnel management circuitry 212 may include a separate processor, specially configured field programmable gate array (FPGA), or a specially programmed application specific integrated circuit (ASIC).

The file remediation circuitry 214 includes hardware, software, firmware, and/or a combination thereof, configured to support various functionality for performing file remediation action(s) associated with one or more target file(s). For example, in some embodiments, the file remediation circuitry 214 includes hardware, software, firmware, and/or a combination thereof, configured to initiate a file remediation action associated with at least a target file identified via a scan. In some embodiments, the file remediation circuitry 214 includes hardware, software, firmware, and/or a combination thereof, configured to receive and/or process a remediation action initiation request from a user in response to user interaction, such as with a scan alert, and initiate a file remediation action associated with at least a target file identified via a scan in response. Alternatively or additionally, in some embodiments, the file remediation circuitry 214 includes hardware, software, firmware, and/or a combination thereof, configured to initiate a file remediation action automatically for a target file in response to identifying the target file via a scan. The file remediation circuitry 214 may be configured to initiate a particular file remediation action based on particular data values associated with the user corresponding to the target file and/or based on particular data values of one or more portions of the file detail data corresponding to the target file. The file remediation action may move the target file to a new storage location, delete the target file from the file repository, configure the target file for monitoring, and/or the like.

In some embodiments, the file remediation circuitry 214 performs one or more of the above-mentioned actions using, in whole or in part, the communications circuitry 208, input/output circuitry 206, and/or processor 202. For example, the file remediation circuitry 214 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, file remediation circuitry 214 may include a separate processor, specially configured field programmable gate array (FPGA), or a specially programmed application specific integrated circuit (ASIC).

It should be appreciated that, in some embodiments, one or more of the sets of circuitries 202-214 are combinable. Alternatively or additionally, in some embodiments, one or more of the modules performs some or all of the functionality described associated with another component. For example, in some embodiments, the sets of circuitry 210, 212, and 214 are combined into a single module embodied in hardware, software, firmware, and/or a combination thereof. Similarly, in some embodiments, one or more of the sets of circuitry 210, 212, and/or 214 is combined such that the processor 202 performs one or more of the operations described above with respect to each of these modules.

Example Data and Data Interactions of the Present Disclosure

Having described example systems and apparatuses in accordance with the present disclosure, example visualizations of data and data interactions between computing devices in accordance with the present disclosure will now be discussed. As described, in some embodiments, the example data objects and data interactions associated therewith may be utilized to perform the file scanning and remediation functionality described herein. For example, the various data interactions may create, store, and/or otherwise process the particular data objects utilized in identifying whether a particular file satisfies applicable scan criteria, identifying a user associated with a target file, and/or providing a scan alert associated with a target file.

FIG. 3 illustrates a block diagram of example interactions between computing devices of an example data system for storing files in shared file repositories, in accordance with at least some example embodiments of the present disclosure. Specifically, FIG. 3 illustrates a plurality of client devices 302A-302E (collectively "client devices 302") in communication with one or more shared file repositories 304. The client devices 302 may interact with the shared file repositories 304 to create, store, access, and/or otherwise manage files stored thereon.

Each of the client devices 302 may be associated with a different user. For example, each of the client devices 302 may be owned and/or operated by a particular user, who may authenticate themselves (e.g., via username and password) to access particular functionality provided by applications installed and/or otherwise made available via the corresponding client device. A single user may be associated with any number of client devices. For example, in some embodiments, client device 302A may represent a smartphone associated with a particular user, and client device 302B may represent a work computing terminal associated with the same user. Client device 302C, for example, may embody a second work computing terminal associated with a different user (e.g., a different employee of an organization).

Each of the client devices 302 may be utilized to create, access, and/or store any number of files via one or more user-facing applications providing particular functionality associated with such files. Such user-facing applications may be installed to the client device, downloaded to the client device, and/or otherwise accessible to the client device such that the use may launch (e.g., execute) any of such user-facing applications to access corresponding functionality provided thereby. For example, the client device 302A may have installed a word processing application, a data sheet management application, a database management application, and one or more integrated development environment application(s), and/or the like, that may be utilized by one or more corresponding user(s) in daily operation. Client device 302E may have the same applications or different applications, for example only a word processing application and a data sheet management application. Each of the client devices 302 may be accessed by their respective user independently to utilize different applications. One or more of the user-facing applications may store one or more file(s) associated with the application to any number of file systems accessible to the corresponding client device to enable such functionality and/or permanent storage of data processable via the application. In this regard, the user may utilize each of the client devices 302 to execute a particular application, access and/or create one or more files for processing, and/or store a new file or an updated version of a file to one or more file repositories, such as the shared file repositories 304.

The shared file repositories 304 may embody any number of databases embodied in hardware, software, firmware, and/or a combination thereof that are accessible to one or more of the client devices 302. In some embodiments, the shared file repositories 304 are embodied by database and/or application server(s), enterprise memory device(s), and/or other computing device(s) specially configured as such database(s). In this regard, the shared file repositories 304 may be embodied by computing hardware external to the client devices 302 and accessible over one or more communications network(s), for example a private communications network embodying an intranet for a particular organization. Alternatively or additionally, in some embodiments, at least one shared file repository 304 may be embodied by a file repository local to one of the client devices 302 and accessible by one or more other client device(s) of the client devices 302 over one or more communications networks.

Each shared file repository of the shared file repositories 304 may be accessible by a particular user, group of users, and/or the like. For example, in some embodiments, a first shared file repository of the shared file repositories 304 is accessible to all user profiles associated with data representing association with a particular business unit in a particular organization (or group of users generally), and a second shared file repository of the shared file repositories 304 is accessible to all user profiles associated with data representing association with a second business unit in the organization. Alternatively or additionally, each shared file repository of the shared file repositories 304 may be associated with particular permissions data indicating one or more user accounts having access to the shared file repository. In some embodiments, different user accounts may have different permissions for accessing and/or otherwise interacting with a particular shared file repository. For example, some users may be associated with user accounts not having access to the shared file repository, other user accounts may have read-permissions only for the shared file repository, and yet other user accounts may have read-write permissions for the shared file repository. Alternatively or additionally, only a particular subset of user accounts may be associated with permissions for deleting files from the shared file repository, and/or moving files to or from the shared file repository. In some embodiments, a shared file repository is associated with an administrative user account, or a particular user account indicated as owner of the shared file repository, that is configured to assign and/or update such permission data for each user.

As a user utilizes a particular client device of the client devices 302, the user may store (e.g., by accessing "save" or "save as" functionality within a user-facing application) an updated file to any of the shared file repositories 304 for permanent storage. In this regard, the user may create and store any number of files, each including user-created content inputted via a corresponding user-facing application configured to alter files of a particular type. In some circumstances, the user selects a particular file repository where the updated file is to be stored.

In some embodiments, different files may be subject to different retention policies associated with the storage of such files in a file repository, such as the shared file repositories 304. For example, files containing particular data (e.g., user personally identifying data, customer information, and/or the like) are stored according to a first retention policy, whereas files containing other particular data (e.g., calculations taking an input and producing an output) are stored according to a second retention policy. The retention policy managing storage of a particular file may indicate the length of time the file is to be stored, a file location where the file is to be stored, an indicator as to whether the file should be stored encrypted, and/or the like. In some contexts, a user may create a file embodying an End User Computing Tool (EUCT), for example which takes input provided in the file or upon execution of the file to perform one or more operations and produce corresponding output. Such EUCTs may be subject to particular file retention policies that define how such files are to be maintained.

The shared file repositories 304 may be scanned for any of a myriad of purposes. For example, in some embodiments, the shared file repositories 304 are scanned via a scanning operation to identify particular target files that satisfy particular scan criteria. In this regard, particular files of the shared file repositories 304 (or all files) may embody a candidate file set for processing. The shared file repositories 304 may be scanned to identify the target files for disposition and/or remediation via one or more file remediation actions, as described herein.

FIG. 4 illustrates a visualization of data embodying or otherwise associated with file data objects stored in a file repository, in accordance with an example embodiment of the present disclosure. Specifically, FIG. 4 illustrates a plurality of files 404, 406, 408, and 410, each maintained via a file repository 402. Each of the plurality of files 404, 406, 408, and 410 may be stored to the file repository 402 by one or more client devices, such as the client devices 302 depicted and described with respect to FIG. 3.

The file repository 402 may embody one or more computing devices embodied in hardware, software, firmware, and/or the like, configured to store files in one or more file locations. The file repository 402 may include any number of sub-repositories, for example sub-folders of a higher-level data system. In some embodiments, the file repository 402 embodies a file repository local to a particular computing device, for example a client device. In other embodiments, the file repository 402 embodies a remote or "cloud" file repository external to the client device. in some embodiments, file repository 402 includes one or more of the shared file repositories 304.

Each file may be associated with file detail data, which embodies various metadata and/or content data that makes up the file. Such file detail data may include one or more data values corresponding to any number of data properties. For example, in some embodiments particular metadata parameters embodying data properties of a file are embodied together with data values corresponding to such data properties. As illustrated, for example, the files 404, 406, 408, and 410 are each associated with file detail data including a data value for a file identifier property, a file permissions data property, a date created data property, a last modified user data property, a last modified date data property, and a file content data property. It should be appreciated that a file may be configured to include any of a myriad of data properties, including data properties that may be input by a user, automatically determined and/or updated upon access, modification, and/or use of a file, and/or the like. Similarly, a file may have any number of content data portion(s), for example each of which is displayable, interactable, and/or updateable by a user. In a context of a file corresponding to a word processor (e.g., a text file) for example, the user may access a file to view the file content data embodying at least text data in a manner that is editable, and subsequently able to be saved such that the updates are permanently stored to the file, by the user.

Each file may be associated with a different data value for each of such properties based on the access, modification, and/or other use of the file. For example, file 404 is associated with a particular file identifier 404A (e.g., a file name and/or storage location), file permissions data 404B, date created data 404C, last modified user data 404D, last modified date data 404E, and file content data 404F. Similarly, file 406 is associated with file identifier 406A, file permissions data 406B, date created data 406C, last modified user data 406D, last modified date data 406E, and file content data 406F. Such values may differ from the data values corresponding to file 404. Further, file 408 is associated with file identifier 408A, file permissions data 408B, date created data 408C, last modified user data 408D, last modified data 408E, and file content data 408F. In some contexts, multiple files may share a particular data value for one or more data properties. For example, multiple files stored in the same file repository may share data value(s) for one or more data properties (e.g., a data value for a file permissions data property, a portion of a file identifier data property, a file storage location data property, and/or the like) in circumstances where the file repository is associated with particular file permissions for all files stored therein.

In some embodiments, a file is associated with a file owner data property. The value(s) of the file owner data property may particularly identify one or more users that are responsible for handling of the file. For example, in some contexts, the data value for the file owner data property of a file identifies a particular user that is to be alerted in a circumstance where the corresponding file is scanned and satisfies scan criteria during a scanning operation. In this regard, the file owner data property may similarly identify a particular user permissioned and/or otherwise authorized to perform a file remediation action associated with the particular file. In some embodiments, the file owner of a particular file is determinable from one or more other data properties for the particular file. For example, in some embodiments, the user indicated by the last modified user data is determined to embody the file owner. Additionally or alternatively, in some embodiments, one or more user(s) indicated to have write permissions based on the data value for the file permissions data property of the file is/are determined to embody file owner(s) for such purposes. In some embodiments, data identifying the file owner may be further utilized, for example by the target file scanning apparatus 200, to identify more detailed file owner data associated with the file owner. For example, in some embodiments the target file scanning apparatus 200 identifies file owner data from a personnel database utilizing a file owner identified embodied by the determined and/or derived value for a file owner data property, as described herein.

As a user interacts with a particular file, data values for any number of data properties may be updated based on such interactions. For example, a user may interact with one or more computing devices, such as a client device, to update the file identifier 410A for file 410. Alternatively or additionally, the user may interact with one or more computing devices, such as a client device, to update the file content data 410F, for example via a user-facing application associated with a file type for the file 410. Alternatively or additionally, the data values for one or more data properties of the file 410 may be updated automatically upon such interactions. For example, in a circumstance where a user accesses the file 410, edits the file content data, and saves an updated version of the file 410, the last modified user data 410D and the last modified date data 410E may each be updated to values that identify the user that performed the updates and represent a current timestamp at the time of save, respectively. Alternatively or additionally, in some contexts, the file permissions data 410B is automatically updated upon movement of the file to a new file repository or storage location within the same file repository (e.g., to a sub-level file repository of the file repository 402).

It should be appreciated that, in this regard, the values corresponding to data properties for a particular file may each be determined during a scan of the file repository 402, for example as performed by a target file scanning apparatus 200. The target file scanning apparatus 200 may identify the data values for such data properties and/or process them as described herein. For example, in some embodiments, the target file scanning apparatus 200 identifies the file type of each particular file, the file content data for a particular file, and file owner data (e.g., based on a last modified user data value, a file creator data value, file permissions data value, and/or the like), and processes such data to determine how to characterize and/or further process the file. For example, in some contexts, such data values are processed to determine whether such data satisfies one or more scan criteria utilized to classify the file and/or determine how to further process the file (e.g., whether one or more scan alert(s) associated with the file should be provided to one or more particular user(s)).

FIG. 5 illustrates a visualization of data embodying or otherwise associated with user data objects stored in a personnel database, in accordance with at least an example embodiment of the present disclosure. Specifically, FIG. 5 illustrates a plurality of user data objects 504, 506, 508, and 510, each maintained via a personnel database 502. Each of the plurality of user data objects 504, 506, 508, and 510 may include a plurality of user data properties and corresponding values. For example, as illustrated, the plurality of user data objects each include data values corresponding to a user identifier data property (e.g., data uniquely identifying the user), a name data property (e.g., a first name, last name, display name, and/or the like for the user), an organization data property (e.g., identifying the organization(s) with which a user is a member of or associated with), a role data property (e.g., identifying a user's role within the organization(s)), a contact data property (e.g., identifying contact methodologies and/or accounts for a user), and a biographical data property (e.g., including biographical information values for the user).

The personnel database 502 may embody one or more computing devices embodied in hardware, software, firmware, and/or the like, configured to store a user data object corresponding for any number of users. The personnel database 502 may include any number of sub-repositories, for example sub-organization-level personnel databases of a data system for a higher-level organization. In some embodiments, the personnel database 502 embodies a database local to a particular computing device, for example a client device or target file scanning apparatus 200. In other embodiments, the personnel database 502 embodies a remote or "cloud" database external to the client device or target file scanning apparatus 200, for example a separate, enterprise personnel database. In some embodiments, the personnel database 502 embodies an enterprise-level human resources database maintaining employee and/or other user information for a particular organization and/or sub-organizations thereof.

In some embodiments, the personnel database 502 may be manually inputted by one or more users of a particular system. For example, in some embodiments, administrator users associated with the computing system maintaining or embodying the personnel database 502 may make changes to the personnel database 502. In some embodiments, for example, particular users and/or roles for users in a particular organization (e.g., high-ranking users or in some embodiments HR users specifically) may be permissioned to access and/or edit the personnel database 502. Such users may manually include new user data object(s), delete existing user data object(s), adjust data associated with one or more existing user data object(s), and/or the like.

Each user data object may be associated with file owner data embodying more-detailed information about the corresponding user. Such file owner data may include one or more data values corresponding to any number of data properties representing detailed user information. For example, in some embodiments, file owner data includes one or more data properties representing information associated with the user's identity, one or more data properties representing information for contacting the user, one or more data properties representing the user's affiliation with one or more organization(s) (e.g., associations with an organization and/or sub-organization, role(s) within said organization(s) and/or sub-organization(s), and/or the like), and/or the like.

In some embodiments, a user may be associated with any number of other user data object(s). The file owner data may include data properties representing such associations. For example, in some embodiments, the file owner data includes one or more data values representing associations between a user data object and another user data object to indicate a particular user's superior in an organization hierarchy. Alternatively or additionally, in some embodiments, the file owner data includes one or more data values representing an alternative user to alert in a circumstance where the user cannot be contacted successfully. In some such embodiments, the data values for such data properties may include user identifiers for the associated users.

Each user data object may be associated with a different data value for each of such data properties, such that the data values represent information particular to a user. For example, user data object 504 is associated with a particular user identifier 504A, name data 504B, organization data 504C, role data 504D, contact data 504E, and biographical data 504F. Similarly, user data object 506 is associated with a particular user identifier 506A, name data 506B, organization data 506C, role data 506D, contact data 506E, and biographical data 506F. Such values may differ from the data values corresponding to user data object 504. Further, user data object 508 is associated with a particular user identifier 508A, name data 508B, organization data 508C, role data 508D, contact data 508E, and biographical data 508F. In some embodiments, multiple user data objects may share a particular data value for one or more data properties. For example, multiple user data objects may share data value(s) for an organization data property, indicating that the users are each a part or otherwise associated with the same organization. Alternatively or additionally, in some embodiments where the user data object includes a data property indicating a user's superior (or other association between users of an organization, such as an alternate user to contact), two user data objects may both share a particular data value indicating that the users each are associated with the same superior user.

The personnel database 502 may be accessed and/or queried, for example by a target file scanning apparatus 200, to identify particular user data objects and/or file owner data associated therewith. For example, in some embodiments, the target file scanning apparatus 200 queries the personnel database 502 for file owner data for a user data object corresponding to a particular user identifier represented by a file owner identifier determined for a particular target file identified via a scanning operation. In this regard, the target file scanning apparatus 200 may leverage the personnel database 502 to identify and/or further process information for a particular user identified as a file owner. In one example context, the target file scanning apparatus 200 identifies contact data for a particular user identified as a file owner to utilize such contact data in providing one or more scan alert(s) to the user.

Example Processes of the Disclosure

Having described example systems, apparatuses, computing environments, and data visualizations, example processes in accordance with the present disclosure will now be described. It should be appreciated that each of the flowcharts depicts an example computer-implemented process that may be performed by one or more of the apparatuses, systems, and/or devices described herein, for example via one or more of the components thereof.

The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 6 illustrates a flowchart depicting example operations in an example process for improved file scanning and remediation, in accordance with at least an example embodiment of the present disclosure. Specifically, FIG. 6 depicts an example process 600 that may be performed utilizing any of a myriad of sub-process(es) and/or sub-step(s) described herein. In some embodiments, the process 600 is embodied by computer program code stored o a non-transitory computer-readable storage medium of a computer program product configured, upon execution, to perform the computer-implemented process described herein. Alternatively or additionally, in some embodiments, the process 600 is performed by one or more specially configured computing devices, such as the target file scanning apparatus 200 alone or in communication with one or more external devices. In this regard, in some such embodiments, the target file scanning apparatus 200 is specially configured by computer program instructions stored thereon, for example in the memory 204 and/or another component depicted and/or described herein, and/or otherwise accessible to the target file scanning apparatus 200, for performing the operations depicted and described. In some embodiments, the specially configured target file scanning apparatus 200 is in communication with one or more external apparatus(es), system(s), device(s), and/or the like, to perform one or more of the operations as depicted and described. For purposes of simplifying the description, the process 600 is described as performed by and from the perspective of the target file scanning apparatus 200.

The process 600 beings at operation 602. At operation 602, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to initiate a scan. The scan may be initiated with particular defined parameters, for example embodying one or more file repositories to be scanned and/or scan criteria to be utilized for performing the initiated scan. In some embodiments, the scan is initiated manually in response to user interaction (e.g., a user initiates the scanning operation when desired). Alternatively or additionally, in some embodiments, the scan is initiated automatically based on one or more system-detected events, triggers, and/or circumstances (e.g., at particular time intervals, determining one or more predefined conditions is/are met, and/or the like).

At operation 604, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to perform the scan. In some embodiments, the target file scanning apparatus 200 identifies a candidate file set based on one or more file repositories to be scanned. For example, the target file scanning apparatus 200 may identify all files stored in one or more determined file repositories, such as predetermined file repositories and/or file repositories indicated in a scan initiation request that initiated the scan. The target file scanning apparatus 200 may identify particular file data for each candidate file during the scan, for example at least a portion of file detail data. In some embodiments, the target file scanning apparatus 200 identifies particular file detail data portions utilized for processing the scanned files (e.g., a particular portion of file detail data to be compared to scan criteria for the initiated scan). In some other embodiments, the target file scanning apparatus 200 identifies all file detail data for one or more candidate files during the scan.

At operation 606, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to process the scan results. In some embodiments, upon identifying the candidate files via the scan, the target file scanning apparatus 200 may identify at least a portion of file detail data for each candidate file and compare such file detail data with one or more scan criteria to determine whether the scan criteria is satisfied. In a circumstance where the scan criteria is satisfied, the candidate file may be identified as a target file for further processing. In this regard, the target file scanning apparatus 200 may track identified target files for further processing, for example by marking such files, storing file identifiers for such files in a data structure including scan results, and/or the like.

At operation 608, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to provide data based on the scan results. In some embodiments, for example, the target file scanning apparatus 200 is configured to generate and/or otherwise provide one or more scan alert(s) to users identified as a file owner for one or more target files identified via the scan. In this regard, the scan alert indicates includes data indicating the existence of one or more target files associated with the user, and/or providing file detail data associated with the target file. In some embodiments, the data embodying a scan result is provided via one or more specially configured user interface (s) that display the file detail data, or a determined portion thereof, for each target file. The file detail data may be rendered such that the user may utilize the file detail data to determine whether to initiate one or more file remediation action(s) associated with each target file. In some embodiments, the target file scanning apparatus 200 provides a scan results report including all target files and/or file detail data associated therewith in one or more data transmissions, files, rendered interfaces, and/or the like.

In some embodiments, the target file scanning apparatus 200 generates and/or provides a scan alert for each user that includes data associated with the target files for which the user was identified as the file owner. For example, in some embodiments, the target file scanning apparatus 200 determines one or more target files associated with the same file owner identifier. The target file scanning apparatus 200 may subsequently utilize the file owner identifier to provide a scan alert associated with each of the target files corresponding to that file owner identifier.

At optional operation 610, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to initiate one or more file remediation action(s). In some embodiments, a file remediation action may be initiated associated with a particular target file. The file remediation action may indicate how storage of the file is to be updated. For example, initiation of a file movement action may initiate storage of the target file to a new storage location and/or file repository. Initiation of a file deletion action may initiate deletion of the target file from the file repository. Additionally or alternatively still, in some embodiment, the initiation of a file monitoring action may configure the file, relocate the file, and/or otherwise update storage of the target file such that the target file is monitored for further activity. In some embodiments a file leave action is initiated, which specifically indicates no further action associated with the target file is necessary.

In some embodiments the file remediation action is performed in response to user interaction such as with a scan alert provided at block 608. For example, in some embodiments, a file remediation action is initiated, for example in response to particular user interaction, for one or more target files identified in the scan alert. Additionally or alternatively, in some embodiments, the file remediation action is initiated, for example in response to particular user interaction, in response to particular information provided via the scan alert, such as file detail data included in the scan alert.

FIG. 7 illustrates a flowchart depicting example operations of another example process for improved file scanning and remediation, in accordance with at least an example embodiment of the present disclosure. Specifically, FIG. 7 depicts another example process 700 for improved file scanning and remediation. In some embodiments, the process 700 is embodied by computer program code stored on a non-transitory computer-readable storage medium of a computer program product configured, upon execution, to perform the computer-implemented process described herein. Alternatively or additionally, in some embodiments, the process 700 is performed by one or more specially configured computing devices, such as the target file scanning apparatus 200 alone or in communication with one or more external devices. In this regard, in some such embodiments, the target file scanning apparatus 200 is specially configured by computer program instructions stored thereon, for example in the memory 204 and/or another component depicted and/or described herein, and/or otherwise accessible to the target file scanning apparatus 200, for performing the operations depicted and described. In some embodiments, the specially configured target file scanning apparatus 200 is in communication with one or more external apparatus(es), system(s), device(s), and/or the like, to perform one or more of the operations as depicted and described. For purposes of simplifying the description, the process 700 is described as performed by and from the perspective of the target file scanning apparatus 200.

The process 700 beings at optional operation 702. At optional operation 702, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to receive a scan initiation request associated with a user. In some embodiments, the scan initiation request is received in response to interaction by the user. For example, the user may interact with a particular application and/or user interface (e.g., provided by the target file scanning apparatus 200) to indicate that the user would like to initiate a scanning operation, where the interaction causes initiation or transmission of the scan initiation request. In other embodiments, the target file scanning apparatus 200 automatically receives the scan initiation request at one or more predetermined timestamp intervals, for example daily, weekly, monthly, quarterly, and/or the like).

The scan initiation request may include or otherwise be associated with one or more data values utilized to perform a corresponding scan operation. For example, in some embodiments, the scan initiation request includes one or more data values identifying particular file repositories to be scanned. The identified file repositories may be predetermined, selected by a particular user (e.g., from a list of available file repositories for scanning), and/or otherwise identified in response to one or more automatic and/or manual selections. Additionally or alternatively, in some embodiments, the scan initiation request includes one or more scan criteria for use in performing a corresponding scan operation. For example, the scan initiation request may indicate one or more scan criteria to be compared to property values for identified candidate files to determine whether such candidate files satisfy the scan criteria (e.g., thus embodying target files) or do not satisfy such scan criteria. The scan criteria may be manually input, for example by a user that manually submitted the scan initiation request. In this regard, the user may select scan criteria from a set of possible scan criteria, and/or may programmatically enter the scan criteria in one or more formats interpretable by the target file scanning apparatus 200, for example. In some other embodiments may be automatically determined (e.g., predetermined, automatically determined by the target file scanning apparatus 200, and/or the like).

In some embodiments, the user that generated the scan initiation request is an administrator or other central user of the data system and/or one or more data repositories to be scanned. For example, in some embodiments, the user that generated the scan initiation request is permissioned as a database administrator or other data steward of the data system and/or one or more data repositories. In other embodiments, the user initiating the scan initiation request comprises an end-user of a particular device interacting with the data system and/or one or more data repositories. For example, in some embodiments, a user utilizing a particular client device having access to read and/or write permissions of one or more file repositories of a data system may utilize the client device to initiate a scanning operation.

At operation 704, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to scan a file repository, based on scan criteria, to identify at least a target file satisfying the scan criteria. The target file scanning apparatus 200 identifies the target file as associated with file detail data. The file detail data may include any amount of metadata and/or content data associated with a particular file. In some contexts, the file detail data comprises at least a file owner identifier corresponding to a user.

The target file scanning apparatus 200 may scan one or more file repositories to identify candidate files stored on such file repositories. In some embodiments, the target file scanning apparatus 200 identifies any files stored on the file repository as candidate files for scanning. In other embodiments, the target file scanning apparatus 200 identifies particular files stored on the file repository that meet particular scan criteria as candidate files for further scanning (e.g., files of a particular file type, and/or the like). It should be appreciated that the target file scanning apparatus 200 may scan each candidate file as it is identified to determine whether the candidate file embodies a target file based on one or more scan criteria. In other embodiments, the target file scanning apparatus 200 identifies file detail data for a plurality of candidate files (e.g., all candidate files of a particular file repository, or plurality of file repositories) and determines which candidate files embody target file(s) upon completion of the identification of the file detail data for the plurality of candidate files.

In some embodiments, the scan may be performed without opening and/or otherwise requiring execution of any of the files being scanned. In this regard, in some such embodiments, the target file scanning apparatus 200 functions in a manner that reduces the computing time and computing resources utilized to successfully scan each file. In some embodiments, the scan comprises one or more sub-phases. For example, in some embodiments, a first scanning phase is performed that identifies a first subset of candidate files based on first one or more scan criteria, and a second scanning phase is performed that identifies target files based on a second one or more scan criteria. In this context, the first sub-phase may embody a fast scanning phase and the second sub-phase may embody a detailed scanning phase of candidate files, for example, to increase the overall throughput of the scanning operation.

At operation 706, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to retrieve, from a personnel database, file owner data associated with the target file based on the file owner identifier. In some embodiments, for example, the target file scanning apparatus 200 is communicable with a particular personnel database. The personnel database may store user information embodying file owner information for any of a plurality of user profiles. For example, in one example context, the personnel database embodies an HR database configured to include user information embodying user profiles for employees and/or other users associated with a particular organization. The personnel database may be configured by one or more administrative users, such administrators, officers, or particular user profiles associated with an organization, to include user profiles for each such users and/or to configure such user profiles to include appropriate permission data for such user profiles.

The target file scanning apparatus 200 may query the personnel database to retrieve the file owner data for the target file. For example, the target file scanning apparatus 200 may query the personnel database utilizing the file owner identifier as a key for retrieving associated file owner data. In this regard, utilizing the file owner identifier for a particular target file (e.g., data indicating the user account that last accessed the file, an indicated owner of a particular file repository, and/or the like) identified from the scanned data and/or metadata for the target file may be utilized to query the personnel data for the corresponding file owner data. Thus, the target file scanning apparatus 200 may utilize the file owner identifier identified via the scanning of the target file to retrieve the more detailed file owner data. In some embodiments, the file owner data includes at least user contact information utilized to provide a scan alert to the user (e.g., a client device identifier, an email or other third-party application user account, and/or the like).

At operation 708, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to provide a scan alert associated with at least the target file to the user. In some embodiments, the scan alert comprises a user interface rendered to a client device associated with the user. For example, the target file scanning apparatus 200 may transmit particular information for rendering a scan alert including such information. In some embodiments, the target file scanning apparatus 200 may cause rendering of a scan alert including at least the file owner data associated with the target file, a portion thereof, and/or other data indicating the target file was identified to satisfy the scan criteria. Alternatively or additionally, in some embodiments, the scan alert includes information indicating any number of target files identified as satisfying the scan criteria. In this regard, a scan alert may be provided to a particular user including such information to alert the user of all target files to be reviewed and/or actioned on by the user (e.g., file owner data for each identified target file). In one example context, the scan alert is provided via a user interface rendered to a user-facing application that provides access to functionality of the target file scanning apparatus 200. In another context, the scan alert is provided via a third-party application executed via a client device.

In some embodiments, the scan alert is provided utilizing at least a portion of the file owner data associated with the target file. For example, the target file scanning apparatus 200 may identify user communication information from the file owner data for use in providing the scan alert. The target file scanning apparatus 200 may transmit data representing the scan alert to the client device utilizing the user communication information.

One or more scan alert(s) may be provided, additionally or alternatively, to one or more other users. For example, in some embodiments, one or more scan alert(s) may be provided to the user that initiated the scanning operation (e.g., the user that transmitted the scan initiation request). The scan alert(s) provided to such additional and/or alternative users may be the same or different from those provided to the identified file owner(s). For example, in some embodiments the target file scanning apparatus 200 provides scan alert(s) to each identified file owner that each indicate the target file(s) identified for each file owner. The target file scanning apparatus 200 may further provide one or more scan alert(s) that list all or a portion of the target file(s) identified via the initiated scanning operation.

At optional operation 710, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to initiate a file remediation action associated with at least the target file identified via the scan. The file remediation action may include one or more process(es) that alter the storage location of the target file, delete the file from the file repository, mark the target file for further monitoring (e.g., to indicate updates to the target file's content, location, and/or the like). Alternatively or additionally, in some embodiments, the file remediation action may include one or more process(es) that leave the target file in place without any altering. In this regard, the user or one or more computing devices (e.g., the target file scanning apparatus 200) may determine necessary actions for updating the storage of the target file, for example based on a retention policy for the target file.

In some embodiments, the file remediation action is initiated in response to one or more particular user interaction(s). For example, the user may interact with the scan alert to initiate at least one file remediation action for a particular target file. Alternatively or additionally, in some embodiments, the user may interact with the scan alert to initiate a file remediation action for a plurality of target file(s), such as for each identified target file or a subset thereof. In some other embodiments, the target file scanning apparatus 200 automatically initiates the file remediation action in response to one or more data-driven determinations. For example, the file remediation action may be initiated based on the file owner data for the target file, file detail data for the target file, the file repository scanned, and/or a combination thereof. In some such embodiments, the target file scanning apparatus 200 determines the appropriate file remediation action for a particular target file, and automatically initiates the file remediation action.

FIG. 8 illustrates a flowchart depicting additional example operations of an example process for improved file scanning and remediation, and specifically for causing rendering of a user interface based on a scan alert, in accordance with at least an example embodiment of the present disclosure. Specifically, FIG. 8 depicts an example process 800 for providing a scan alert associated with at least the target file by causing rendering of a scan results dashboard interface. In some embodiments, the process 800 is embodied by computer program code stored on a non-transitory computer-readable medium of a computer program product configured for execution to perform the computer-implemented process described. Alternatively or additionally, in some embodiments, the process 800 is performed by one or more specially configured computing devices, such as the target file scanning apparatus 200 alone or in communication with one or more external devices. In this regard, in some such embodiments, the target file scanning apparatus 200 is specially configured by computer program instructions stored thereon, for example in the memory 204 and/or another component depicted and/or described herein, and/or otherwise accessible to the target file scanning apparatus 200, for performing the operations depicted and described. In some embodiments, the specially configured target file scanning apparatus 200 is in communication with one or more external apparatus(es), system(s), device(s), and/or the like, to perform one or more of the operations including the various operations depicted and described herein. For purposes of simplifying the description, the process 800 is described as performed by and from the perspective of the target file scanning apparatus 200.

The process 800 begins at operation 802. In some embodiments, the process 800 begins after one or more operations of another process, such as the operation 706 of the process 700 as depicted and described. Additionally or alternatively, in some embodiments, upon completion of the process 800 flow proceeds to one or more operations of another process, such as the operation 710 of the process 700 as depicted and described. In other embodiments, the flow ends upon completion of the process 800.

At operation 802, the target file scanning apparatus 200 includes means, such as the scanning circuitry 210, the communications circuitry 208, the input/output circuitry 206, and/or the processor 202, to cause rendering of a scan results dashboard interface comprising the scan alert. In this regard, the scan results dashboard interface may include interface elements indicating each target file identified as satisfying the scan criteria based on the performed scanning operation. For example, the scan results dashboard may include all or at least a portion of file detail data for each target file. Additionally or alternatively, in some embodiments, the scan results dashboard interface includes one or more interface elements for initiating one or more particular file remediation action(s) associated with a particular target file. For example, in some embodiments, the scan results dashboard interface includes an interface element for initiating a file movement action associated with the target file, a second interface element for initiating a file deletion action associated with the target file, a third interface element for initiating a file leave action associated with the target file, and/or the like.

The scan results dashboard interface may be rendered via a user-facing application executed on a user device associated with a client device associated with the user to which the scan alert is provided. For example, in some embodiments, a user identified by the file owner identifier utilizes a user-facing application associated with the target file scanning apparatus 200 and executed via a corresponding client device to establish an authenticated session with the target file scanning apparatus 200 (e.g., by logging into a user account utilizing corresponding authentication credentials), and via the authenticated session the target file scanning apparatus 200 provides information such as the file detail data for at least the target file to cause rendering of the scan results dashboard interface comprising the scan alert. In some embodiments, the scan results dashboard interface is rendered via a user-facing web application utilized to access functionality of the target file scanning apparatus 200. In some such embodiments, the target file scanning apparatus 200 may transmit data embodying the scan results dashboard interface as a web page to be rendered via the client device associated with the user.

FIG. 9 illustrates a flowchart depicting additional example operations of an example process for improved file scanning and remediation, and specifically for causing transmitting of a third-party data transmission comprising a scan alert, in accordance with at least an example embodiment of the present disclosure. Specifically, FIG. 9 depicts an example process 900 for providing a scan alert associated with at least the target file by causing transmitting of a third-party data transmission. In some embodiments, the process 900 is embodied by computer program code stored on a non-transitory computer-readable medium of a computer program product configured for execution to perform the computer-implemented process described. Alternatively or additionally, in some embodiments, the process 900 is performed by one or more specially configured computing devices, such as the target file scanning apparatus 200 alone or in communication with one or more external devices. In this regard, in some such embodiments, the target file scanning apparatus 200 is specially configured by computer program instructions stored thereon, for example in the memory 204 and/or another component depicted and/or described herein, and/or otherwise accessible to the target file scanning apparatus 200, for performing the operations depicted and described. In some embodiments, the specially configured target file scanning apparatus 200 is in communication with one or more external apparatus(es), system(s), device(s), and/or the like, to perform one or more of the operations including the various operations depicted and described herein. For purposes of simplifying the description, the process 900 is described as performed by and from the perspective of the target file scanning apparatus 200.

The process 900 begins at operation 902. In some embodiments, the process 900 begins after one or more operations of another process, such as the operation 706 of the process 700 as depicted and described. Additionally or alternatively, in some embodiments, upon completion of the process 900 flow proceeds to one or more operations of another process, such as the operation 710 of the process 700 as depicted and described. In other embodiments, the flow ends upon completion of the process 900.

At operation 902, the target file scanning apparatus 200 includes means, such as the scanning circuitry 210, the communications circuitry 208, the input/output circuitry 206, and/or the processor 202, to cause transmitting of a third-party data transmission comprising the scan alert. The third-party data transmission may be transmitted to a third-party user communication profile associated with the user. For example, the third-party user communication profile may be registered associated with a third-party application. In this regard, the third-party data transmission may cause rendering of the scan alert via the third-party application upon access of the third-party application by the user.

The target file scanning apparatus 200 may identify the third-party user communication profile via the file owner data associated with the target file. For example, in some embodiments, the target file scanning apparatus 200 identifies the third-party user communication profile based on user communication information indicated in the file owner data associated with the target file. In one example context, the third-party user communication profile comprises an email address associated with an email application for which the user is registered. The email address may be identified as user contact information in the file owner data, retrieved from the personnel database, associated with the user corresponding to the target file. In other embodiments, the third-party user communication profile comprises a social media profile, messaging service profile, and/or the like, indicated by user contact information included in the file owner data for the user.

FIG. 10 illustrates a flowchart depicting additional example operations of an example process for improved file scanning and remediation, and specifically for scanning and remediation for a second identified target file associated with a second user, in accordance with at least an example embodiment of the present disclosure. Specifically, FIG. 10 depicts an example process 1000 for identifying and processing a second target file as part of a scanning operation. In some embodiments, the process 1000 is embodied by computer program code stored on a non-transitory computer-readable medium of a computer program product configured for execution to perform the computer-implemented process described. Alternatively or additionally, in some embodiments, the process 1000 is performed by one or more specially configured computing devices, such as the target file scanning apparatus 200 alone or in communication with one or more external devices. In this regard, in some such embodiments, the target file scanning apparatus 200 is specially configured by computer program instructions stored thereon, for example in the memory 204 and/or another component depicted and/or described herein, and/or otherwise accessible to the target file scanning apparatus 200, for performing the operations depicted and described. In some embodiments, the specially configured target file scanning apparatus 200 is in communication with one or more external apparatus(es), system(s), device(s), and/or the like, to perform one or more of the operations including the various operations depicted and described herein. For purposes of simplifying the description, the process 1000 is described as performed by and from the perspective of the target file scanning apparatus 200.

The process 1000 begins at operation 1002. In some embodiments, the process 1000 begins after one or more operations of another process, such as the operation 704 of the process 700 as depicted and described. Additionally or alternatively, in some embodiments, upon completion of the process 1000 flow proceeds to one or more operations of another process, such as the operation 706 of the process 700 as depicted and described. In other embodiments, the flow ends upon completion of the process 1000.

At operation 1002, the target file scanning apparatus 200 includes means, such as the scanning circuitry 210, the communications circuitry 208, the input/output circuitry 206, and/or the processor 202, to identify, from the scan, at least a second target file associated with second file detail data comprising at least a second file owner identifier corresponding to a second user. In this regard, the second target file may be identified during the scanning operation initiated at a previous step, for example operation 704. The second target file may be identified during scanning of a second candidate file identified within a particular file repository for scanning, for example. It should be appreciated that, in some embodiments, the second candidate file may be one of a plurality of other candidate files scanned.

The second file detail data may include any metadata and/or content data associated with a particular file determined to satisfy the one or more scan criteria associated with the scanning operation. The second file detail data includes at least a second file owner identifier corresponding to a second user. In this regard, the second user may be identified as a file owner associated with the second target file based on one or more portions of the second file detail data for the second target file, the particular file sub-repository where the second target file is stored, and/or the like, which may differ from the corresponding data for the first target file. For example, in an example context where the target file scanning apparatus 200 identifies the file owner for a particular file based on data indicating a last user accessing the file, the first target file may be associated with a first user having last accessed the first target file and the second target file may be associated with a second user having last accessed the second target file. The last user accessing the file may be identified from one or more data values in the file detail data. In another context, the same user last accessed both the first and second target files, and thus would be indicated as the file owner for each.

At operation 1004, the target file scanning apparatus 200 includes means, such as the scanning circuitry 210, the communications circuitry 208, the input/output circuitry 206, and/or the processor 202, to retrieve, from the personnel database, second file owner data associated with the second target file based on the second file owner identifier. For example, the target file scanning apparatus 200 may query the personnel database utilizing the second file owner identifier to retrieve the second file owner data. The second file owner data may represent various user information associated with the second user, such as and without limitation, name data, user contact information, biographical data, and/or the like associated with a particular corresponding user profile. In this regard, the second file owner identifier may be utilized as a key for retrieving the file owner data particular to the second user. In some embodiments, the second file owner data includes at least second user contact information utilized to provide a scan alert to the second user (e.g., a client device identifier for a client device associated with the second user, an email or other third-party application user account corresponding to the second user, and/or the like).

At optional operation 1006, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to provide a second scan alert associated with at least the second target file to the second user. In some embodiments, the scan alert comprises a user interface renderable to a second client device associated with the second user. For example, the target file scanning apparatus 200 may transmit particular information associated with the second target file for rendering including such information. In some embodiments, the target file scanning apparatus 200 may cause rendering of a scan alert including at least the second file owner data associated with the second target file, a portion thereof, and/or other data indicating the second target file was identified to satisfy the scan criteria. In this regard, the target file scanning apparatus 200 may provide the second scan alert to the second user to notify the second user that the second target file was identified as satisfying the scan criteria, and the target file scanning apparatus 200 may provide the first scan alert to the first user to separately notify the first user that the first target file was identified as satisfying the scan criteria. Each of the first user and the second user may review the scan alert(s) to make one or more determinations regarding the identified target file(s) and/or to initiate appropriate file remediation action(s) for each of the identified target files. It should be appreciated that the target file scanning apparatus 200 may identify any number of target files and any number of distinct file owner(s) corresponding to such target file(s).

In some embodiments, each scan alert is provided utilizing at least a portion of the file owner data associated with the associated target file. For example, the target file scanning apparatus 200 may identify user communication information for a first scan alert associated with a first target file from the first file owner data for use in providing the first scan alert (e.g., to a first client device associated with the first user identified as a file owner for the first target file). Similarly, the target file scanning apparatus 200 may identify user communication information for a second scan alert associated with a second target file from the second file owner data for use in providing the second scan alert (e.g., to a second client device associated with the second user identified as a file owner for the second target file). The target file scanning apparatus 200 may transmit data representing each respective scan alert to a respective client device utilizing the user communication information identified from file owner data for each target file.

At optional operation 1008, the target file scanning apparatus 200 includes means, such as the scanning circuitry 210, personnel management circuitry 212, file remediation circuitry 214, communications circuitry 208, input/output circuitry 206, processor 202, and/or the like, or a combination thereof, to initiate a second file remediation action associated with at least the second target file. In some embodiments, the second file remediation action may include any of the file remediation actions described with respect to operation 710, for example. It should be appreciated that the second file remediation action may be the same as the first file remediation action initiated at operation 710, or in some contexts may differ from the file remediation action initiated at operation 710. For example, in some embodiments, based on the particular file detail data and/or file owner data for each target file, a different file remediation action may be initiated for each that appropriately alters the storage of each file to meet requirements of one or more retention policies applicable to such target files.

In some embodiments, each file remediation action is initiated in response to one or more particular user interaction(s) from the corresponding file owner. For example, the first user may interact with the first scan alert to initiate at least one file action for the first target file, and the second user may interact with the second scan alert to initiate at least one file action for the second target file. The first user may determine via the first scan alert that the first target file should be deleted and initiate a file deletion action for the first target file, for example, and the second user may determine via the second scan alert that the second target file should be left in place and initiate a file leave action for the second target file. It should be appreciated that each user may initiate a file remediation action for each respective target file at a different time, and/or via different client device(s). In other embodiments, the first scan alert is associated with any number of target files for which the first user is determined to be the file owner, and the second scan alert is associated with any number of target files for which the second user is determined to be the file owner.

In some other embodiments, the target file scanning apparatus 200 automatically determines and/or initiates the first file remediation action for the first target file and the second file remediation action for the second target file. For example, the target file scanning apparatus 200 may determine the first file remediation action is appropriate for the first target file based on data associated with the first target file, such as the file repository where the first target file is stored, the file owner data for the first target file, and/or file detail data for the first target file. Further, the target file scanning apparatus 200 may determine the second file remediation action (e.g., which may be the same or different from the first file remediation action) is appropriate for the second target file based on data associated with the second target file, such as a file repository where the second target file is stored, the file owner data for the second target file, and/or file detail data for the second target file. The target file scanning apparatus 200 may initiate such file remediation actions in response to each of the data-driven determinations.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory having computer-coded instructions stored thereon, wherein the computer-coded instructions, in execution via the at least one processor, configure the apparatus to:
   scan a file repository, based on scan criteria, to identify a target file satisfying the scan criteria, wherein scanning the file repository is executed without scanning an entirety of file content data of the target file;
   parse the target file to retrieve file detail data comprising at least a file owner identifier corresponding to a user associated with the target file;
   automatically retrieve, from a personnel database separate from the file repository, file owner data associated with the target file using the file owner identifier included in the file detail data, wherein the file owner data comprises user communication information of the user associated with the target file;
   generate a scan alert associated with at least the target file; and
   transmit, using the automatically retrieved user communication information included in the file owner data, the scan alert to the user associated with the target file.

2. The apparatus according to claim 1, wherein to generate the scan alert associated with at least the target file, the apparatus is configured to:
   cause rendering of a scan results dashboard interface comprising the scan alert.

3. The apparatus according to claim 1, the apparatus further configured to:
   initiate a file remediation action associated with at least the target file identified via the scan in response to user interaction with the scan alert.

4. The apparatus according to claim 1, the apparatus further configured to:
   automatically initiate a file remediation action in response to identification of the target file satisfying the scan criteria.

5. The apparatus according to claim 1, wherein to transmit the scan alert to the user associated with the target file, the apparatus is configured to:
   cause transmission of a third-party data transmission comprising the scan alert to a third-party user communication profile associated with the user, the third-party user communication profile identified using the user communication information included in the file owner data associated with the target file.

6. The apparatus according to claim 1, wherein the scan further identifies a second target file satisfying the scan criteria, the second target file associated with second file detail data comprising at least a second file owner identifier corresponding to a second user different from the user, the apparatus further configured to:
   automatically retrieve, from the personnel database, second file owner data associated with the second target file based on the second file owner identifier, wherein the second file owner data comprises second user communication information;
   generate a second scan alert associated with at least the second target file; and
   transmit, using the automatically retrieved second user communication information included in the second file owner data, the second scan alert to the second user.

7. The apparatus according to claim 1, wherein the file owner identifier comprises file permissions data associated with the target file.

8. The apparatus according to claim 1, wherein the file owner identifier comprises file authorship data associated with the target file.

9. The apparatus according to claim 1, wherein the scan further identifies a second target file satisfying the scan criteria, the second target file associated with second file detail data comprising at least the file owner identifier corresponding to the user, wherein the scan alert is further associated with the second target file.

10. A computer-implemented method comprising:
    scanning a file repository, based on scan criteria, to identify a target file satisfying the scan criteria, wherein scanning the file repository is executed without scanning an entirety of file content data of the target file;
    parsing the target file to retrieve file detail data comprising at least a file owner identifier corresponding to a user associated with the target file;
    automatically retrieving, from a personnel database separate from the file repository, file owner data associated with the target file using the file owner identifier included in the file detail data, wherein the file owner data comprises user communication information of the user associated with the target file;

generating a scan alert associated with at least the target file; and transmitting, using the automatically retrieved user communication information included in the file owner data, the scan alert to the user associated with the target file.

11. The computer-implemented method according to claim 10, wherein generating the scan alert associated with at least the target file comprises:

causing rendering of a scan results dashboard interface comprising the scan alert.

12. The computer-implemented method according to claim 10, the computer-implemented method further comprising:

initiating a file remediation action associated with at least the target file identified via the scan in response to user interaction with the scan alert.

13. The computer-implemented method according to claim 10, the computer-implemented method further comprising:

automatically initiating a file remediation action in response to identification of the target file satisfying the scan criteria.

14. The computer-implemented method according to claim 10, wherein transmitting the scan alert to the user associated with the target file comprises:

causing transmission of a third-party data transmission comprising the scan alert to a third-party user communication profile associated with the user, the third-party user communication profile identified using the user communication information included in the file owner data associated with the target file.

15. The computer-implemented method according to claim 10, wherein the scan further identifies a second target file satisfying the scan criteria, the second target file associated with second file detail data comprising at least a second file owner identifier corresponding to a second user different from the user, and the computer-implemented method further comprising:

automatically retrieving, from the personnel database, second file owner data associated with the second target file based on the second file owner identifier, wherein the second file owner data comprises second user communication information;

generating a second scan alert associated with at least the second target file; and transmitting, using the automatically retrieved second user communication information included in the second file owner data, the second scan alert to the second user.

16. The computer-implemented method according to claim 10, wherein the scan further identifies a second target file satisfying the scan criteria, the second target file associated with second file detail data comprising at least the file owner identifier corresponding to the user, wherein the scan alert is further associated with the second target file.

17. A computer program product comprising at least one non-transitory computer-readable storage medium having computer program code stored thereon that, in execution with at least one processor, are configured for:

scanning a file repository, based on scan criteria, to identify a target file satisfying the scan criteria, wherein scanning the file repository is executed without scanning an entirety of file content data of the target file;

parsing the target file to retrieve file detail data comprising at least a file owner identifier corresponding to a user associated with the target file;

automatically retrieving, from a personnel database separate from the file repository, file owner data associated with the target file using the file owner identifier included in the file detail data, wherein the file owner data comprises user communication information of the user associated with the target file;

generate a scan alert associated with at least the target file; and transmitting, using the automatically retrieved user communication information included in the file owner data, the scan alert to the user associated with the target file.

18. The computer program product according to claim 17, wherein generating the scan alert associated with at least the target file comprises:

causing rendering of a scan results dashboard interface comprising the scan alert.

19. The computer program product according to claim 17, the computer program product further configured for:

initiating a file remediation action associated with at least the target file identified via the scan in response to user interaction with the scan alert.

20. The computer program product according to claim 17, the computer program product further configured for:

automatically initiating a file remediation action in response to identification of the target file satisfying the scan criteria.

* * * * *